United States Patent
Takeuchi

(10) Patent No.: US 7,835,883 B2
(45) Date of Patent: Nov. 16, 2010

(54) METHOD AND DEVICE FOR MEASURING ROTATION SPEED OF ROTATING EQUIPMENT

(75) Inventor: Kesatoshi Takeuchi, Shioziri (JP)

(73) Assignee: Seiko Epson Corporation (JP)

( * ) Notice: Subject to any disclaimer, the term of this patent is extended or adjusted under 35 U.S.C. 154(b) by 317 days.

(21) Appl. No.: 12/012,476

(22) Filed: Feb. 1, 2008

(65) Prior Publication Data
US 2008/0255796 A1  Oct. 16, 2008

(30) Foreign Application Priority Data
Feb. 5, 2007 (JP) .............................. 2007-025324
Nov. 2, 2007 (JP) .............................. 2007-286432

(51) Int. Cl.
G01P 3/00 (2006.01)
G06F 19/00 (2006.01)

(52) U.S. Cl. .................................................... 702/145

(58) Field of Classification Search ................. 702/145, 702/106; 73/494, 514.39
See application file for complete search history.

(56) References Cited

U.S. PATENT DOCUMENTS

| | | | | |
|---|---|---|---|---|
| 4,166,976 A | * | 9/1979 | Ruhnau et al. | 324/166 |
| 4,418,307 A | * | 11/1983 | Hoffmann et al. | 318/721 |
| 4,636,696 A | * | 1/1987 | Minakuchi et al. | 388/809 |
| 4,799,178 A | * | 1/1989 | Spadafora et al. | 702/146 |
| 5,408,153 A | * | 4/1995 | Imai et al. | 310/68 B |
| 6,049,351 A | * | 4/2000 | Noguchi et al. | 347/249 |
| 7,328,122 B2 | * | 2/2008 | Courtney | 702/142 |
| 7,446,447 B2 | * | 11/2008 | Takeuchi | 310/112 |
| 2002/0009288 A1 | * | 1/2002 | Azuma | 386/80 |
| 2003/0202221 A1 | * | 10/2003 | Motoi et al. | 358/474 |
| 2008/0001561 A1 | * | 1/2008 | Takeuchi | 318/254 |

FOREIGN PATENT DOCUMENTS
JP  2001-298982  10/2001

* cited by examiner

*Primary Examiner*—Cindy H Khuu
(74) *Attorney, Agent, or Firm*—Harness, Dickey & Pierce, P.L.C.

(57) ABSTRACT

A rotation speed measuring device includes a position sensor outputting position signals indicating M (M >2) rotation positions of equal phase difference per rotation of the rotating equipment, a clock signal generator generating a clock signal; a counter counting the pulses of the clock signal; a measuring interval setting unit setting a duration coefficient indicating the ratio of a measuring interval during which the number of pulses is to be counted within a time period between two successively occurring position signals, to the entire time period between the two position signals; and causing the counter to count the number of pulses during the measuring interval; and a calculating unit calculating the rotation speed of the rotating equipment as a function of the frequency of the basic clock signal, the integer M, the duration coefficient, and the count value obtained by the counter.

12 Claims, 20 Drawing Sheets

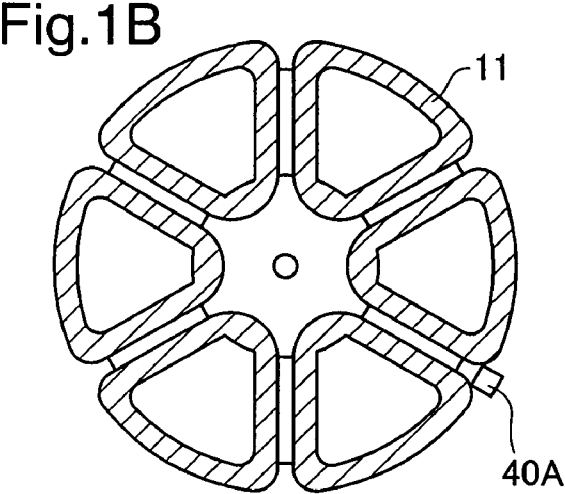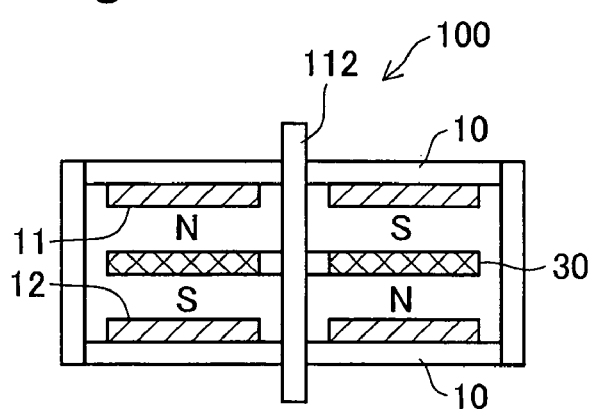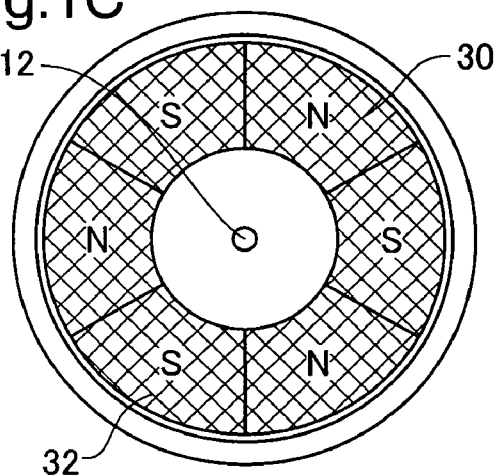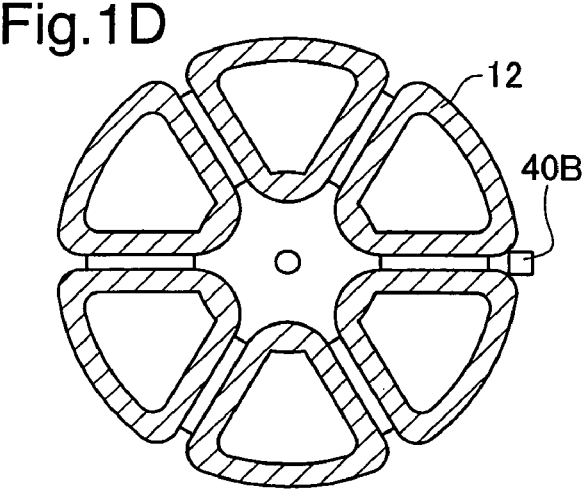

Phase = immediately prior to $2\pi$ (phase A polarity reverses at $2\pi$)

Phase = $\pi/4$

Phase = immediately prior to $\pi/2$ (phase B polarity reverses at $\pi/2$)

Phase = $3\pi/4$ $Y = a \cdot X + b$
or
$Y = a(X+b)$

SSA

DRVA1+DRVA2

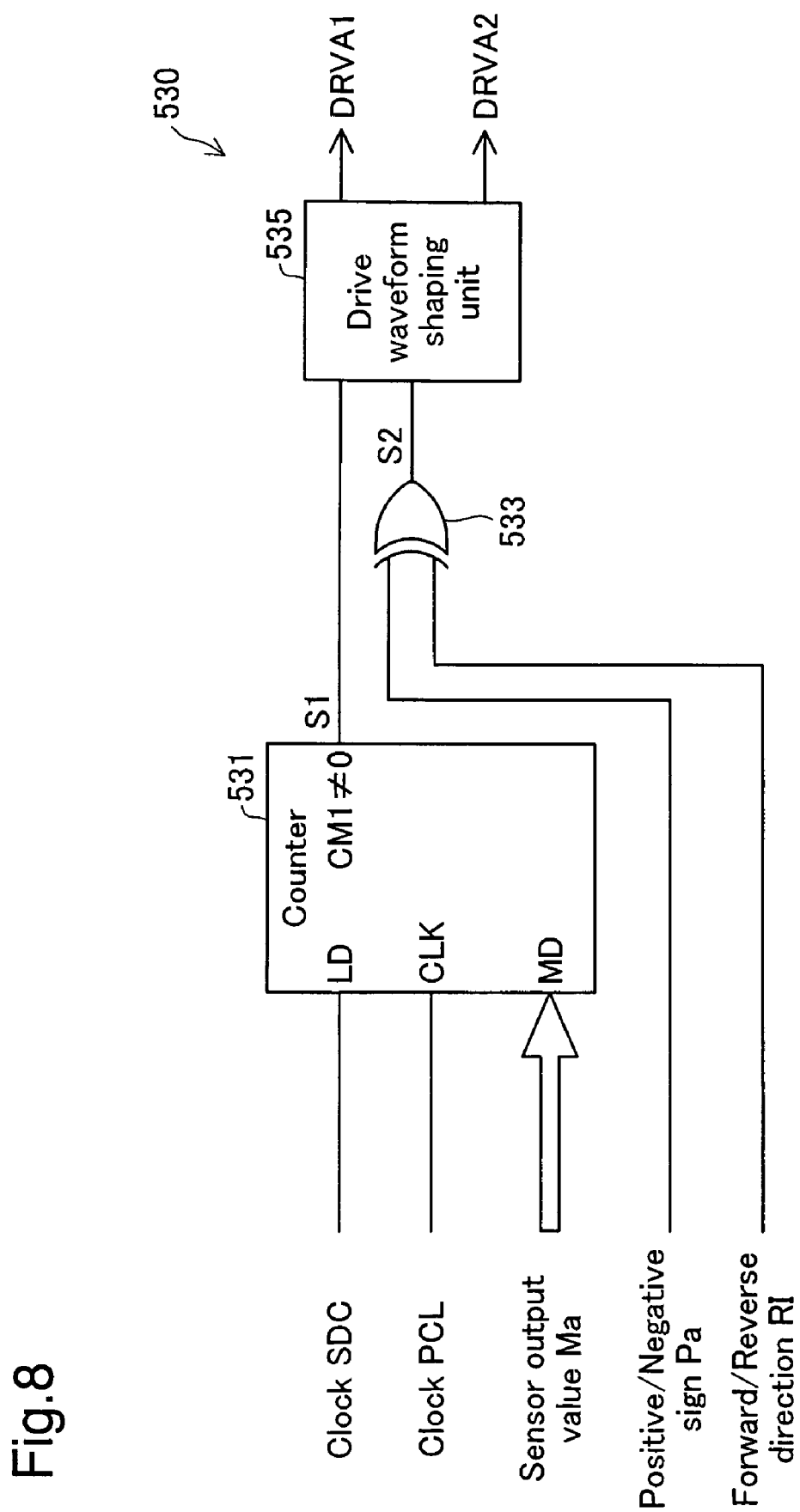

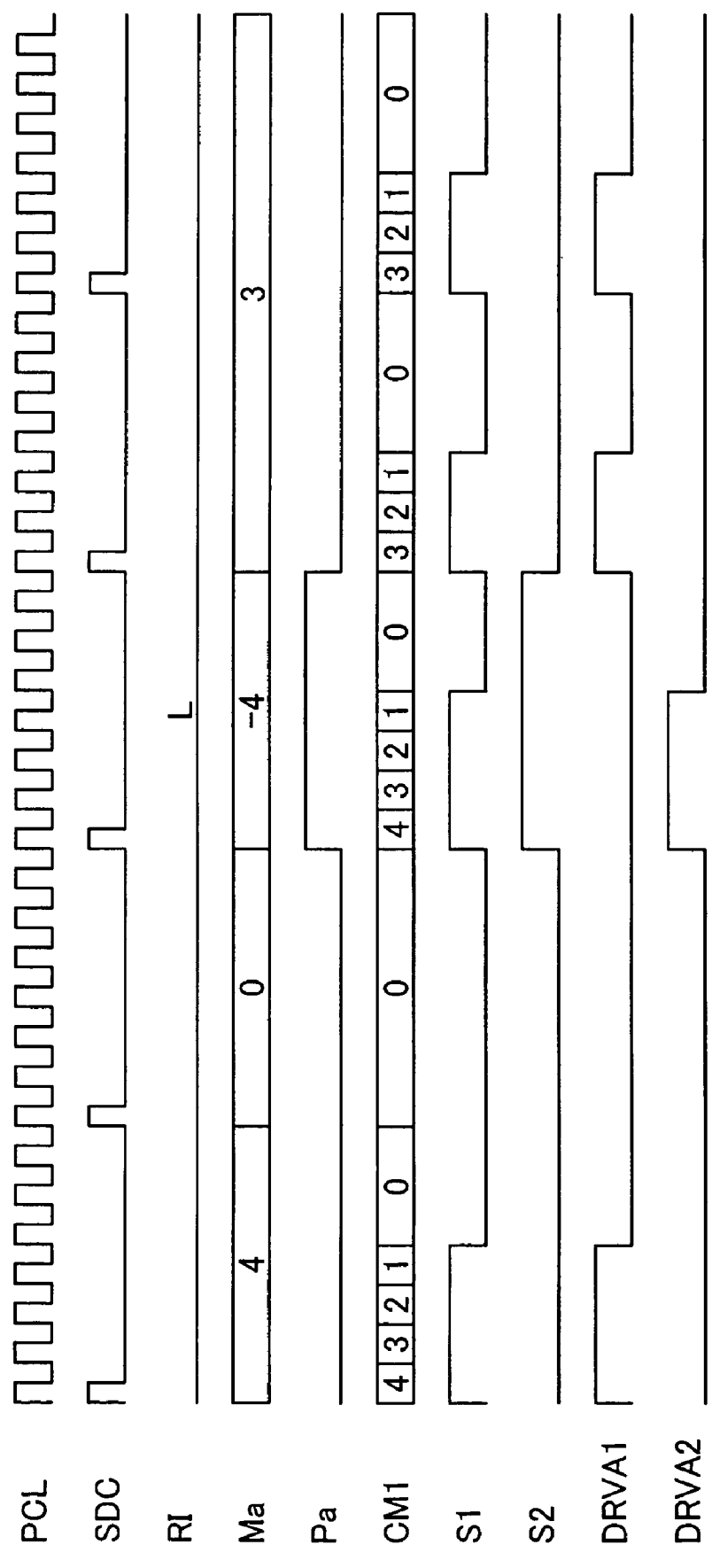
Fig.9 During forward rotation(RI="L")

During reverse rotation (RI="H")

Fig.13

Pole number = P = 6 [P]

Measuring frequency = Fc = 1000000 [Hz]

| Rotation speed | Rotations per second | Single-pole period | Duration coefficient | CNTLT value | Calculation value VA | Calculation value VB | Error |
|---|---|---|---|---|---|---|---|
| Nrev[rpm] | Nsec [rotations/S] | Tpole[S] | Ga | [puls] | VA | VB[rpm] | δ [%] |
| 0.1 | 0.0017 | 100.00000 | 0.02 | 2000000 | 10000000 | 0.1 | 0.0 |
| 0.4 | 0.0067 | 25.00000 | 0.05 | 1250000 | 10000000 | 0.4 | 0.0 |
| 0.7 | 0.0117 | 14.28571 | 0.10 | 1428571 | 10000000 | 0.7 | 0.0 |
| 1 | 0.0167 | 10.00000 | 0.20 | 2000000 | 10000000 | 1.0 | 0.0 |
| 4 | 0.0667 | 2.50000 | 0.20 | 500000 | 10000000 | 4.0 | 0.0 |
| 7 | 0.1167 | 1.42857 | 0.20 | 285714 | 10000000 | 7.0 | 0.0 |
| 10 | 0.1667 | 1.00000 | 0.20 | 200000 | 10000000 | 10.0 | 0.0 |
| 40 | 0.6667 | 0.25000 | 0.20 | 50000 | 10000000 | 40.0 | 0.0 |
| 70 | 1.1667 | 0.14286 | 0.20 | 28571 | 10000000 | 70.0 | 0.0 |
| 100 | 1.6667 | 0.10000 | 0.20 | 20000 | 10000000 | 100.0 | 0.0 |
| 400 | 6.6667 | 0.02500 | 0.20 | 5000 | 10000000 | 400.0 | 0.0 |
| 700 | 11.6667 | 0.01429 | 0.20 | 2857 | 10000000 | 700.0 | 0.0 |
| 1000 | 16.6667 | 0.01000 | 0.20 | 2000 | 10000000 | 1000.0 | 0.0 |
| 4000 | 66.6667 | 0.00250 | 0.40 | 1000 | 10000000 | 4000.0 | 0.0 |
| 7000 | 116.6667 | 0.00143 | 0.70 | 1000 | 10000000 | 7000.0 | 0.0 |
| 10000 | 166.6667 | 0.00100 | 1.00 | 1000 | 10000000 | 10000.0 | 0.0 |

Upper limit value=2000000
Lower limit value=1000

METHOD AND DEVICE FOR MEASURING ROTATION SPEED OF ROTATING EQUIPMENT

CROSS-REFERENCE TO RELATED APPLICATIONS

The present application claims the priority based on Japanese Patent Applications No. 2007-25324 filed on Feb. 5, 2007, and No. 2007-286432 filed on Nov. 2, 2007, the disclosures of which are hereby incorporated by reference in its entirety.

BACKGROUND OF THE INVENTION

1. Field of the Invention

This invention relates to technology for measuring rotation speed of rotating equipment, such as an electric motor.

2. Description of the Related Art

The electric motor disclosed in JP2001-298982A is one example of an electric motor that utilizes permanent magnets and magnet coils.

Conventionally, rotation speed of rotating equipment such as an electric motor is determined by measuring the time required for a single rotation, for example.

However, a problem with this approach is that if rotation speed is slow, a single rotation may take a long time, so that the duration of measurement takes a long time. Another problem is that measurement error depends on the rotation speed; it tends to be low during rotation at high speed.

SUMMARY OF THE INVENTION

One object of the present invention is to provide technology allowing rotation speed of rotating equipment to be measured with good accuracy in a short time.

According to one aspect of the present invention, there is provided a device for measuring rotation speed of rotating equipment. The rotation speed measuring device comprises a position sensor configured to output position signals indicating M number of rotation positions of a equal phase difference in each one rotation of the rotating equipment where M is an integer equal to or greater than 2. The device further comprises a clock signal generator configured to generate a basic clock signal, a counter configured to count the number of pulses of the basic clock signal, and a measuring interval setting unit. The measuring establishes a duration coefficient that indicates a ratio of a measuring interval during which the number of pulses of the basic clock signal is to be counted within a time period between two successively occurring position signals, to the entire time period between the two position signals. The measuring interval setting unit causes the counter to count the number of pulses of the basic clock signal during the measuring interval. The device further comprises a calculating unit configured to calculate a rotation speed of the rotating equipment as a function of the frequency of the basic clock signal, the integer M, the duration coefficient, and a count value obtained by the counter during the measuring interval.

According to the above configuration, counting of the number of pulses by the counter is carried out only during a measuring interval within the entire time period between the successive two position signals, whereby it is possible for measurement to be completed within a shorter time than if counting are carried out throughout the entire time period.

The present invention may be reduced to practice in various ways, the possible embodiments thereof including, for example, a method and device for measuring rotation speed; an electric motor equipped with a rotation speed measuring device and a method for control thereof; an actuator or device employing the same, and so on.

BRIEF DESCRIPTION OF THE DRAWINGS

FIGS. 1A to 1D are sectional views depicting the configuration of the motor body of the electric motor in the embodiment:

FIGS. 6A to 6E illustrate the internal configuration and operation of a drive signal generator:

FIG. 8 is a block diagram depicting internal configuration of a PWM unit:

FIG. 9 is a timing chart depicting operation of the PWM unit during forward rotation of the motor:

FIG. 13 shows relationships among the motor rotation speed Nrev, and the various parameters Tpole, Ga, CNTLT, VA, and VB:

DESCRIPTION OF THE PREFERRED EMBODIMENT

Figure 2A:
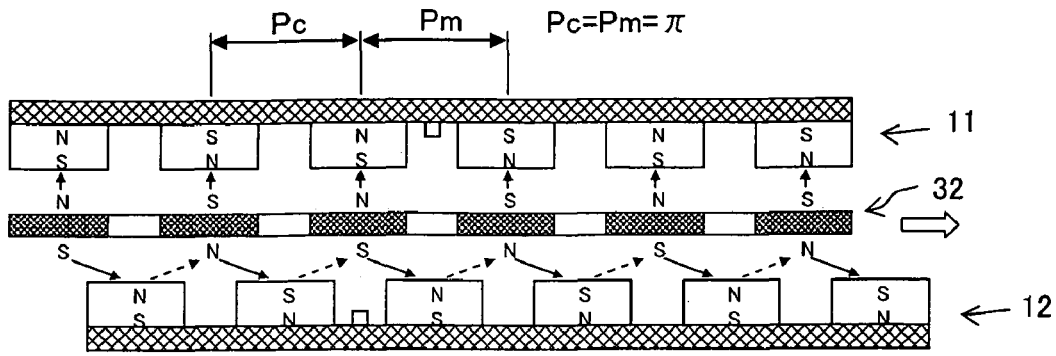
FIGS. 2A to 2D illustrate the basic principle of operation of the electric motor in the embodiment.

The embodiments of the invention will be described in the order indicated below.

A. Overall Configuration and Operation of Electric Motor
B. Configuration and Operation of Measuring Unit
C. Alternative Configuration of Measuring Unit
D. Modification Examples A. Overall Configuration and Operation of Electric Motor FIG. 1A shows in sectional view the configuration of the motor unit of an electric motor pertaining to a first embodiment of the present invention. This motor unit 100 has a stator unit 10 and a rotor unit 30 each with generally disk-shaped contours. The rotor unit 30 has a magnet array 32 composed of a plurality of magnets and affixed to a rotating shaft 112. The direction of magnetization of the magnet array 32 is the vertical direction. The stator unit 10 has a phase A coil array 11 situated above the rotor unit 30, and a phase B coil array 13 situated below the rotor unit 3.

FIG. 1B through 1D depict separately the first coil array 11 of the stator unit 10, the rotor unit 30, and the second coil array 12 of the stator unit 10. In this example, the phase A coil array 11 and the phase B coil array 12 each have six coils; and the magnet array 32 has six magnets. Consequently, this motor constitutes a so-called six-pole motor. However, it is possible for the numbers of coils and magnets (i.e. the number of poles) to be set to any arbitrary value. As shown in FIGS. 1B and 1D, a phase A magnetic sensor 40A is provided to the phase A coil array 11, and a phase B magnetic sensor 40B is provided to the phase B coil array 12.

FIG. 2A through 2D depict operation of the electric motor of the embodiment. In this example, the magnet array 32 is depicted as moving rightward over time with respect to the coil arrays 11, 12. The sideways direction in the drawings corresponds to the direction of rotation of the rotor unit 30 shown in FIG. 1A.

FIG. 2A depicts the condition at timing just prior to the phase advancing to $2\pi$. The solid arrows drawn between the coils and the magnets show the direction of attraction force, while the broken arrows show the direction of repulsion force. In this condition, the phase A coil array 11 does not impart to magnet array 32 with actuating force in the operating direction (rightward in the drawings), and the magnetic force acts in the direction attracting the magnet array 32 towards the phase A coil array 11. Accordingly, in preferred practice application voltage to the phase A coil array will go to zero at the timing at which phase advances to $2\pi$. Meanwhile, the phase B coil array 12 imparts actuating force in the operating direction to the magnet array 32. Since the phase B coil array imparts not only attraction force but also repulsion force to the magnet array 32, net force from the phase B coil array in the vertical direction with respect to the magnet array 32 (the direction perpendicular to the operating direction of the magnet array 32) will be zero. Accordingly, in preferred practice application voltage to the phase B coil array will reach its peak value at the timing at which phase advances to $2\pi$.

Figure 2B:
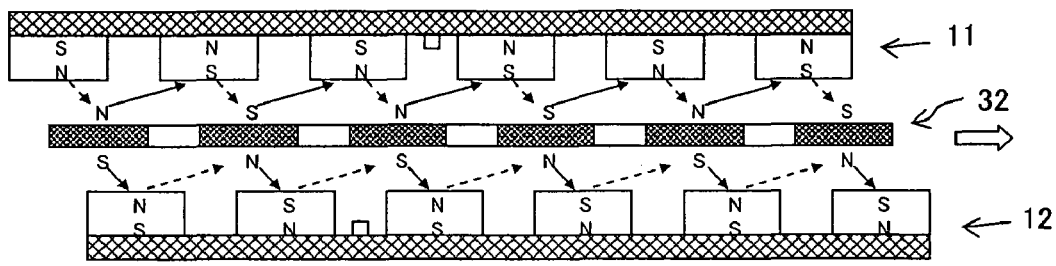
Figure 2C:
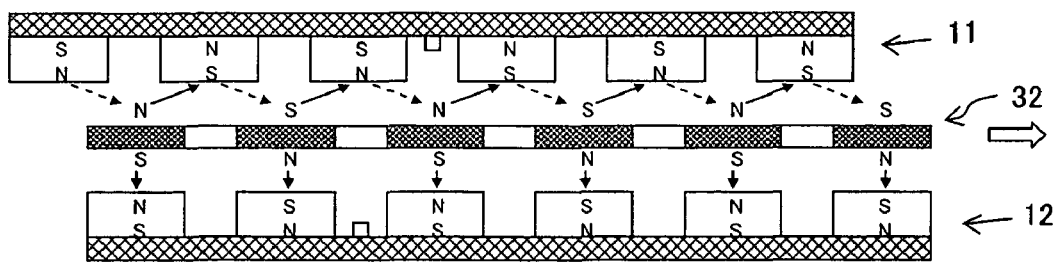
Figure 2D:
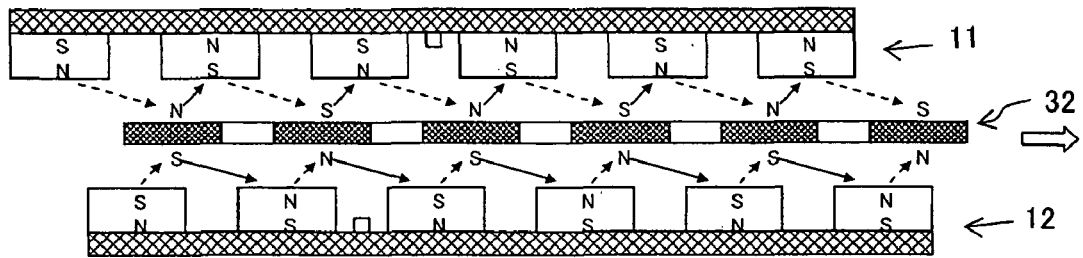

As shown in FIG. 2B, the polarity of the phase A coil array 11 reverses at the timing of the phase advancing to $2\pi$. FIG. 2B depicts the condition where the phase is $\pi/4$; the polarity of the phase A coil array has been reversed from that in FIG. 2A. In this condition, the phase A coil array 11 and the phase B coil array 12 impart identical actuating force in the operating direction of the magnet array 32. FIG. 2C depicts the condition at timing just prior to the phase advancing to $\pi/2$. In the opposite of the condition shown in FIG. 2A, only the phase A coil array 11 imparts actuating force in the operating direction to the magnet array 32. The polarity of the phase B coil array 12 reverses at the timing of the phase advancing to $\pi/2$, and assumes the polarity shown in FIG. 2D. FIG. 2D depicts the condition where the phase is $3\pi/4$. In this condition, the phase A coil array 11 and the phase B coil array 12 impart identical actuating force in the operating direction of the magnet array 32.

As will be understood from FIG. 2A through 2D, the polarity of the phase A coil array 11 switches at the timing at which the coils of the phase A coil array 11 are facing the magnets of the magnet array 32. The same applies to the phase B coil array as well. As a result, actuating force will be generated from substantially all of the coils, making it possible to generate a high level of torque.

The period during which phase advances between $\pi$ and $2\pi$ is substantially the same as in FIG. 2A through 2D and will not be discussed in detail, except to note that the polarity of the phase A coil array 11 again reverses at the timing of the phase advancing to $\pi$, and the polarity of the phase B coil array 12 again reverses at timing when the phase advances to $3\pi/2$.

Figure 3A:
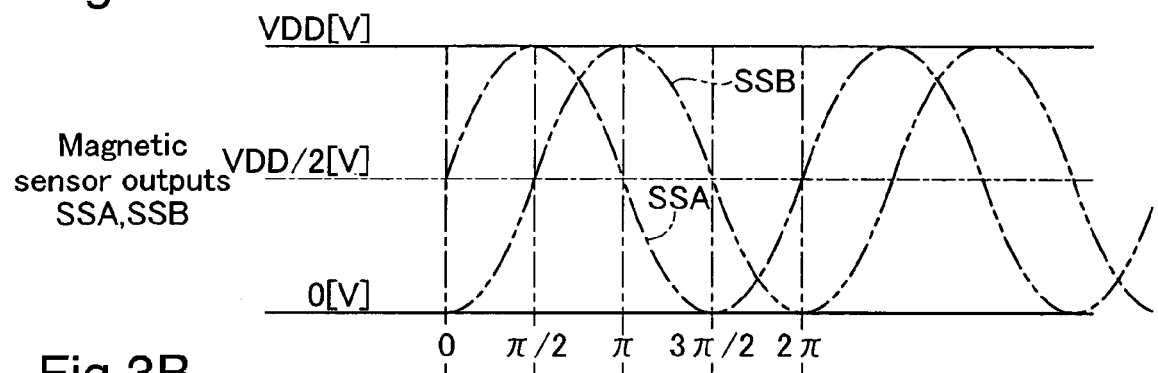
FIGS. 3A to 3C illustrate exemplary sensor outputs and drive signals.
Figure 3B:
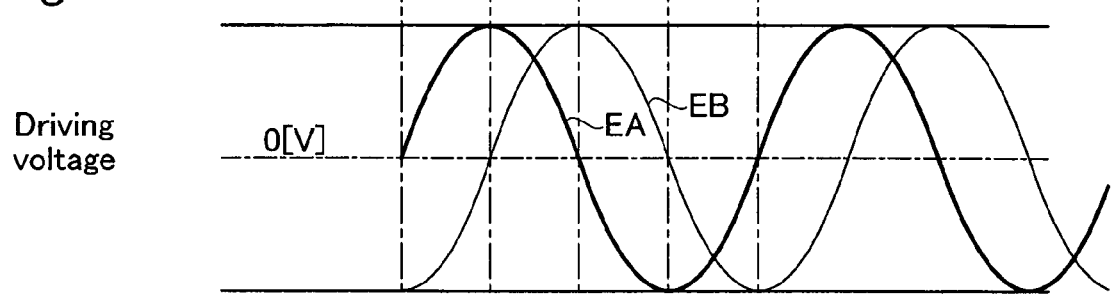
Figure 3C:
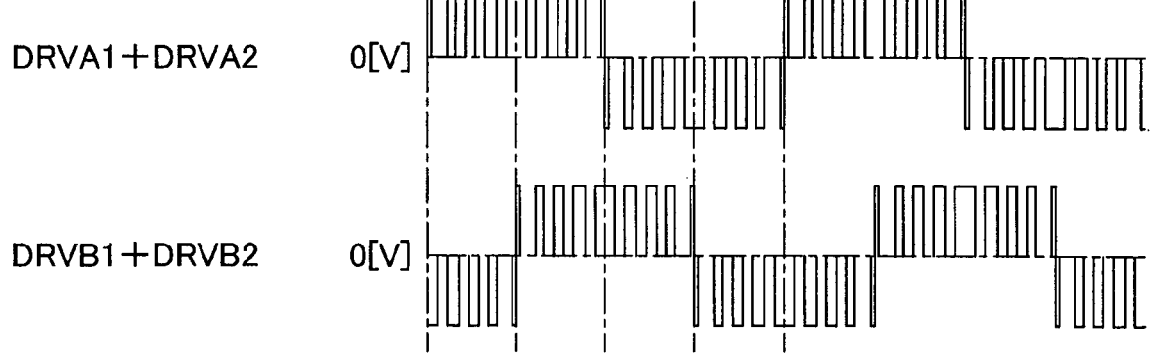

FIGS. 3A to 3C illustrate exemplary sensor outputs and drive signals. FIG. 3A shows a sensor output SSA of the phase A magnetic sensor 40A, and a sensor output SSB of the phase B magnetic sensor 40B. Hall IC sensors having analog output may be employed as the magnetic sensors 40A, 40B. FIG. 3B shows an example of an effective driving voltage EA applied to the phase A coils 11, and an effective driving voltage EB applied to the phase B coils 12. These effective driving voltages EA, EB will preferably have shape similar to the respective magnetic sensor outputs SSA, SSB. FIG. 3C shows an example of drive signals for the two phases, generated respectively by PWM control using the magnetic sensor outputs SSA, SSB. The effective driving voltage VA shown in FIG. 3B represents effective voltage obtained through phase A drive signals DRVA1, DRVA2. The phase A first drive signal DRVA1 is a signal that pulses only when the magnetic sensor output SSA is positive, and the second drive signal DRVA2 is a signal that pulses only when the magnetic sensor output SSA is positive; these are shown together in FIG. 3C. For convenience in illustration, the second drive signal DRVA2 is depicted by negative pulses. This convention is employed for phase B as well.

Figure 4A:
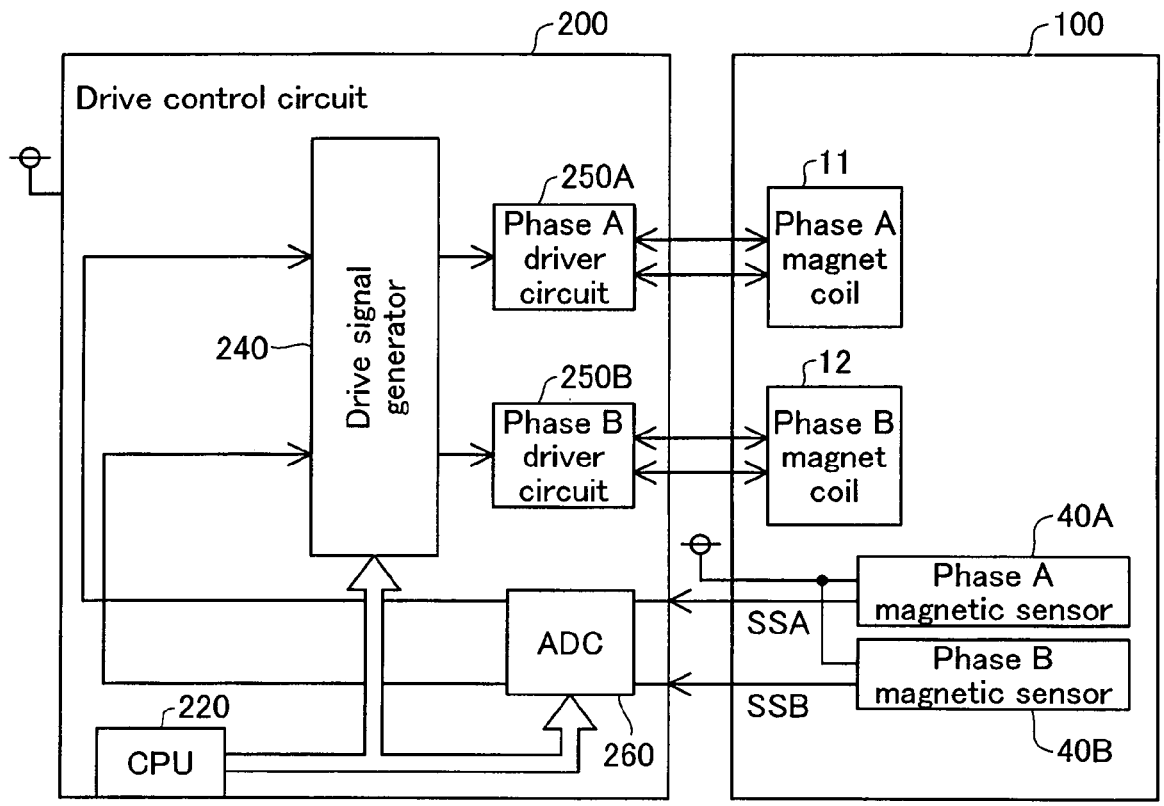
FIGS. 4A and 4B are block diagrams depicting the configuration of a drive control circuit of the brushless motor of the embodiment.

FIG. 4A is a block diagram depicting the configuration of a drive control circuit of the brushless motor of the present embodiment. The drive control circuit 200 has a CPU 220; a drive signal generator 240; driver circuits 250A, 250B for the two phases; and an AD conversion unit 260. The two magnetic sensor outputs SSA, SSB are converted to digital multivalue signals by the AD conversion unit 260, and are presented to the drive signal generator 240. The drive signal generator 240 generates two phase drive signals (FIG. 3C) on the basis of these two magnetic sensor outputs SSA, SSB. In accordance with these two phase drive signals, the driver circuits 250A, 250B drive the two phase magnet coil groups 11, 12 within the motor unit 100.

Figure 4B:
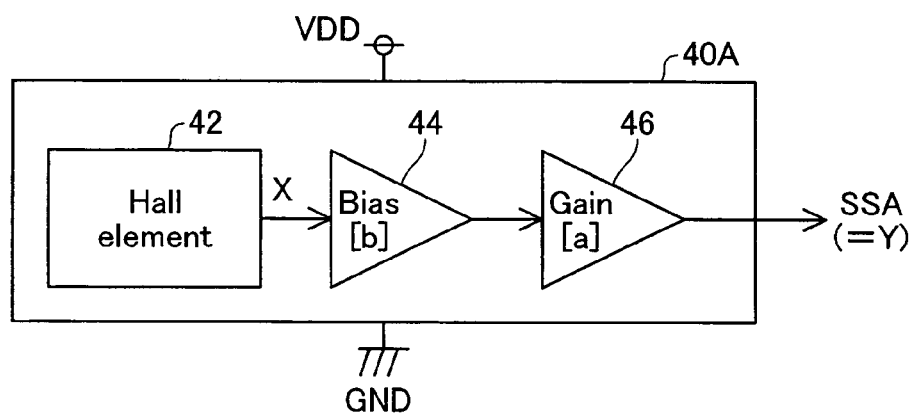

FIG. 4B depicts an exemplary internal configuration of the magnetic sensor 40A. The phase B magnetic sensor 40B will have the same configuration. This magnetic sensor 40A has a Hall element 42, a bias adjusting unit 44, and a gain adjusting unit 46. The Hall element 42 measures magnetic flux density X. The bias adjusting unit 44 adds a bias value b to the output X of the Hall element 42; the gain adjusting unit 46 performs multiplication by a gain value a. The output SSA (=Y) of the magnetic sensor 40A is given, for example, by either one of the following Expressions.

$Y = a \cdot X + b$ $Y = a \cdot (X + b)$

The gain value a and the bias value b of the magnetic sensor 40A will be set within the magnetic sensor 40A by the CPU 220. By setting the gain value a and the bias value b to appropriate values, it is possible to correct the magnetic sensor output SSA to an appropriate waveform. The arrangement is similar for the phase B magnetic sensor 40B.

Figure 5:
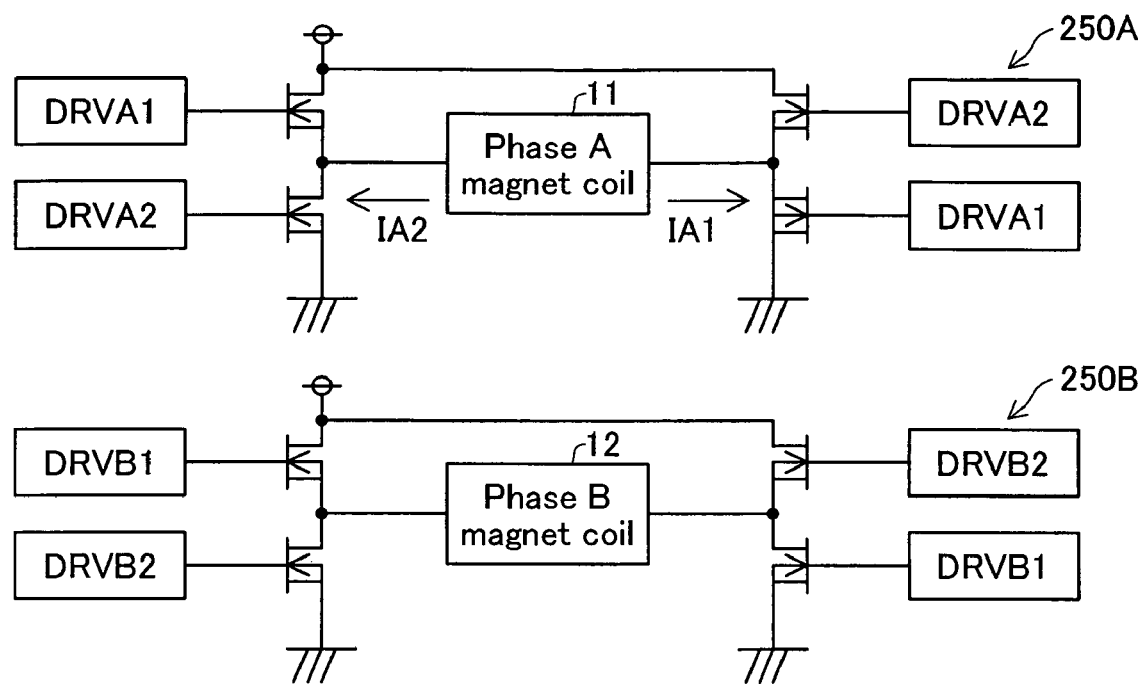
FIG. 5 shows the internal configuration of a driver circuit.

FIG. 5 depicts the internal configuration of a driver circuit. The driver circuits 250A, 250B for each phase are respectively composed of H-bridge circuits. For example, the phase A driver circuit 250A drives the phase A coils 11 according to the drive signals DRVA1, DRVA2. The arrows labeled IA1, IA2 respectively indicate the direction of current flow caused by the drive signals DRVA1, DRVA2. This convention applies to the other phase as well. As the driver circuits, it is possible to utilize circuits of various configuration composed of several drive transistors. In preferred practice, a level shifter circuit will be provided in front of the control terminal of the transistor on the High end (the end closer to the power supply); however, it has been omitted from the illustration here.

FIGS. 6A to 6E illustrate the internal configuration and operation of the drive signal generator 240 (FIG. 4A). Here, for convenience in illustration only the phase A circuit elements are shown; however, identical circuit elements are provided for phase B as well.

The drive signal generator 240 has a basic clock generating circuit 510; a 1/N frequency divider 520; a PWM unit 530; a forward/reverse direction value register 540; an encoder 560; a measuring unit 580; and a measurement enable signal generator 590. The phase A magnetic sensor output SSA is presented to the encoder 560 and to the measurement enable signal generator 590.

The measuring unit 580 is a circuit for measuring the rotation speed of the electric motor. As will be discussed later, the measurement enable signal generator 590 generates and presents to the measuring unit 580 a measurement enable signal Enb that indicates an interval (measuring interval) for counting the number of pulses of the basic clock signal, in the measuring unit 580. This measurement interval is also termed the "measuring interval" or "measuring period." Specifics of the configuration and operation of the measuring unit 580 and the measurement enable signal generator 590 will be discussed later.

The basic clock generating circuit 510 is a circuit that generates a clock signal PCL having prescribed frequency, and is composed of a PLL circuit, for example. The frequency divider 520 generates a clock signal SDC having frequency equal to 1/N that of the clock signal PCL. The value of N is set to a prescribed fixed value. This value of N has been previously set in the frequency divider 520 by the CPU 220. In response to the clock signals PCL, SDC, a sensor output value Ma supplied by the encoder 560, a forward/reverse direction value RI supplied by the forward/reverse direction value register 540, and a positive/negative sign signal Pa supplied by the encoder 560, the PWM unit 530 generates the phase A drive signals DRVA1, DRVA2 (FIG. 3C).

The value RI indicating the rotation direction of the motor is set within the forward/reverse direction value register 540 by the CPU 220. In the present embodiment, the motor rotates forward when the forward/reverse direction value RI is L level, and in reverse when the value is H level. The other signals Ma and Pa presented to the PWM unit 530 are determined in the following manner.

The output SSA of the magnetic sensor 40A is presented to the encoder 560. The encoder 560 converts the range of the magnetic sensor output SSA, as well as setting to zero the value of the middle point of the sensor output. As a result, the sensor output value Ma generated by the encoder 560 assumes values within a prescribed positive range (e.g. between +127 and 0) and within a prescribed negative range (e.g. between 0 and −127). However, the value presented to the PWM unit 530 by the encoder 560 is the absolute value of the sensor output value Ma; the positive or negative sign thereof is provided to the PWM unit 530 in the form of the positive/negative sign signal Pa.

FIG. 6B through 6E depict operation of the PWM unit 530 in instances where the sensor output value Ma assumes various values. The PWM unit 530 is a circuit that, during a single cycle of the clock signal SDC, generates one pulse at a duty factor of Ma/N. Specifically, as shown in FIG. 6B through 6E, in association with increased of the sensor output value Ma, the pulse duty factor of the phase A drive signals DRVA1, DRVA2 will increase. The first drive signal DRVA1 is a signal that pulses only when the magnetic sensor output SSA is positive, and the second drive signal DRVA2 is a signal that pulses only when the magnetic sensor output SSA is positive; in FIG. 6B through 6E, these are shown together. For convenience, the second drive signal DRVA2 is shown as negative pulses.

Figure 6A:
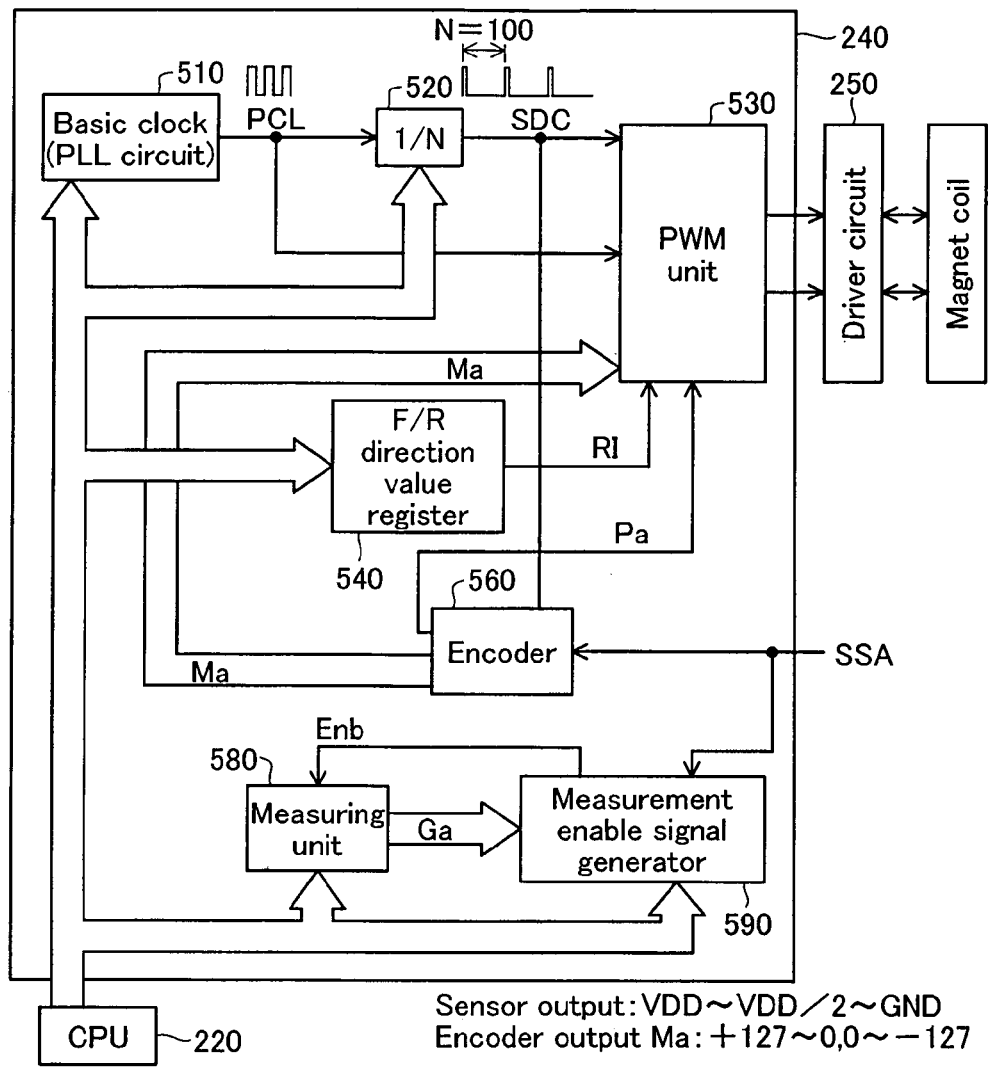
Figure 6B:
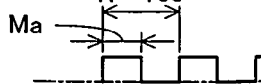
Figures 7A, 7B:
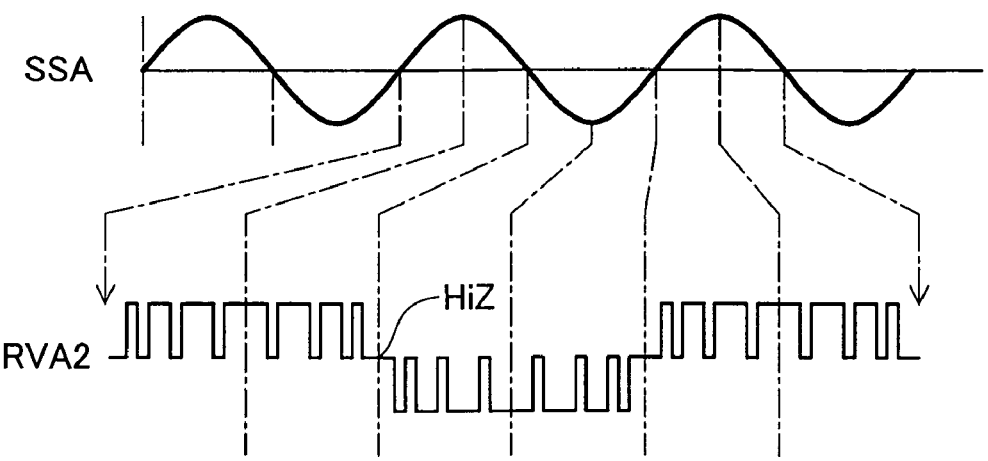
FIGS. 7A and 7B illustrate correspondence relationships between magnetic sensor output waveform and of drive signal waveforms.

FIGS. 7A and 7B are illustrations depicting correspondence relationships between waveform of a magnetic sensor output and waveform of drive signals generated by the PWM unit 530. In the drawing, "Hiz" denotes a high impedance state with the magnet coils in the unexcited state. As explained in FIGS. 6A to 6E, the phase A drive signals DRVA1, DRVA2 are generated through PWM control using the analog waveform of the magnetic sensor output SSA. Consequently, using these phase A drive signals DRVA1, DRVA2 it is possible to present the coils with effective voltage exhibiting changes in level that correspond to changes in the magnetic sensor output SSA.

FIG. 8 is a block diagram depicting an exemplary internal configuration of the PWM unit 530 (FIG. 6A). The PWM unit 530 has a counter 531, an EXOR circuit 533, and a drive waveform shaping unit 535. Their operations will be described below.

FIG. 9 is a timing chart depicting operation of the PWM unit 530 during forward rotation of the motor. In the drawing, there are shown the two clock signals PCL and SDC, the forward/reverse direction value RI, the sensor output value Ma, the positive/negative sign signal Pa, the counter value CM1 in the counter 531, the output S1 of the counter 531, the output S2 of the EXOR circuit 533, and the output signals DRVA1, DRVA2 of the drive waveform shaping unit 535. In each single period of the clock signal SDC, the counter 531 repeats an operation of decrementing the count value CM1 down to 0, in sync with the clock signal PCL. The initial value of the count value CM1 is set to the sensor output value Ma. In FIG. 9, for convenience in illustration, negative values are shown for sensor output values Ma as well; however, absolute values |Ma| thereof will be used in the counter 531. The output S1 of the counter 531 is set to H level when the count value CM1 is not 0, and drops to L level when the count value CM1 goes to 0.

The EXOR circuit 533 outputs a signal S2 representing the exclusive OR of the positive/negative sign signal Pa and the forward/reverse direction value RI. When the motor is rotating forward, the forward/reverse direction value RI will be L level. Consequently, the output S2 of the EXOR circuit 533 will be a signal identical to the positive/negative sign signal Pa. The drive waveform shaping unit 535 generates the drive signals DRVA1, DRVA2 from the output S1 of the counter 531 and the output S2 of the EXOR circuit 533. Specifically, in the output S1 of the counter 531, the signal at intervals in which the output S2 of the EXOR circuit 533 is L level will be output as the drive signal DRVA1, and the signal at intervals in which the output S2 of the EXOR circuit 533 is H level will be output as the drive signal DRVA2.

Figure 10:
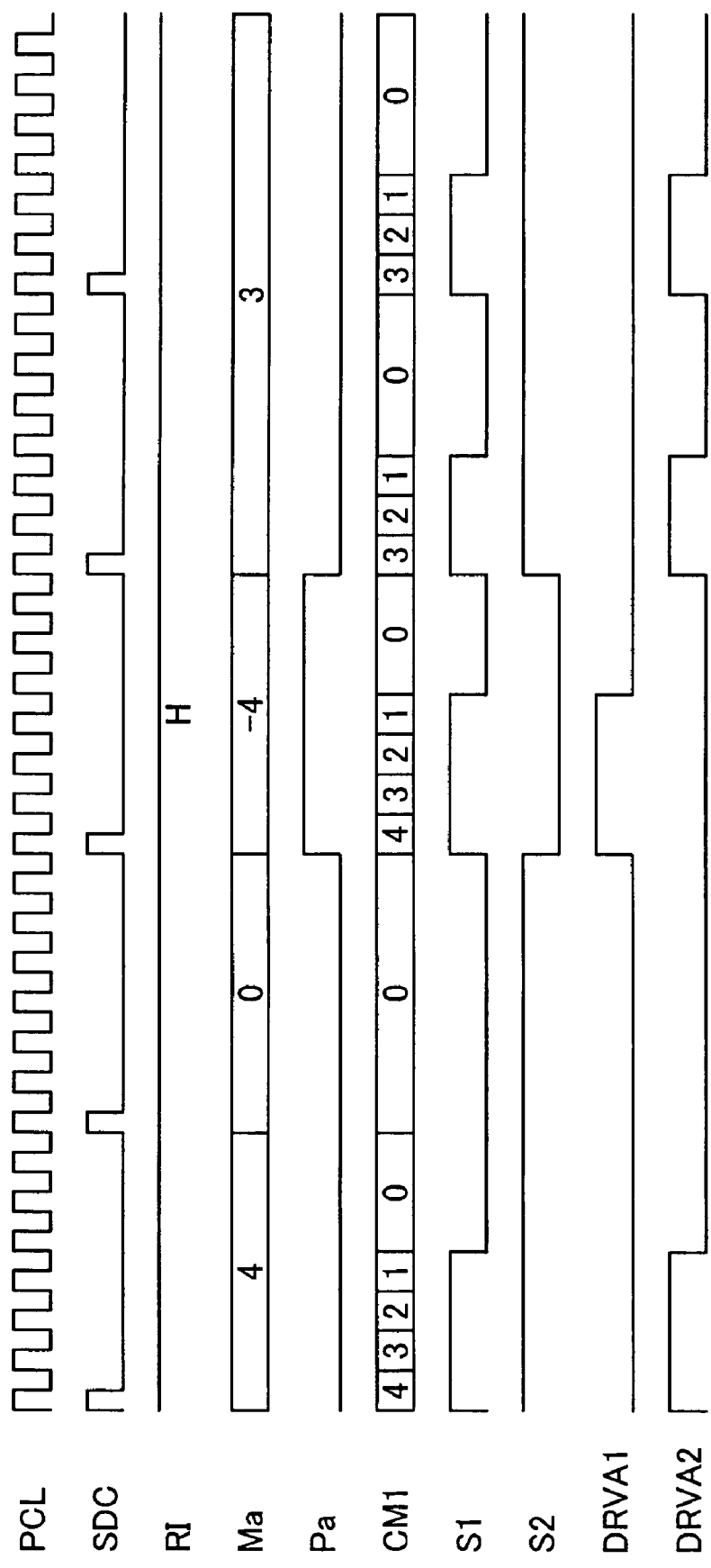
FIG. 10 is a timing chart depicting operation of the PWM unit during reverse rotation of the motor.

FIG. 10 is a timing chart depicting operation of the PWM unit 530 during reverse rotation of the motor. During reverse rotation of the motor, the forward/reverse direction instruction value RI will be set to H level. It will be appreciated that as a result, the two drive signals DRVA1, DRVA2 will be exchanged with those from FIG. 9, and as a result the motor will rotate in reverse.

B. Configuration and Operation of Measuring Unit

Figure 11:
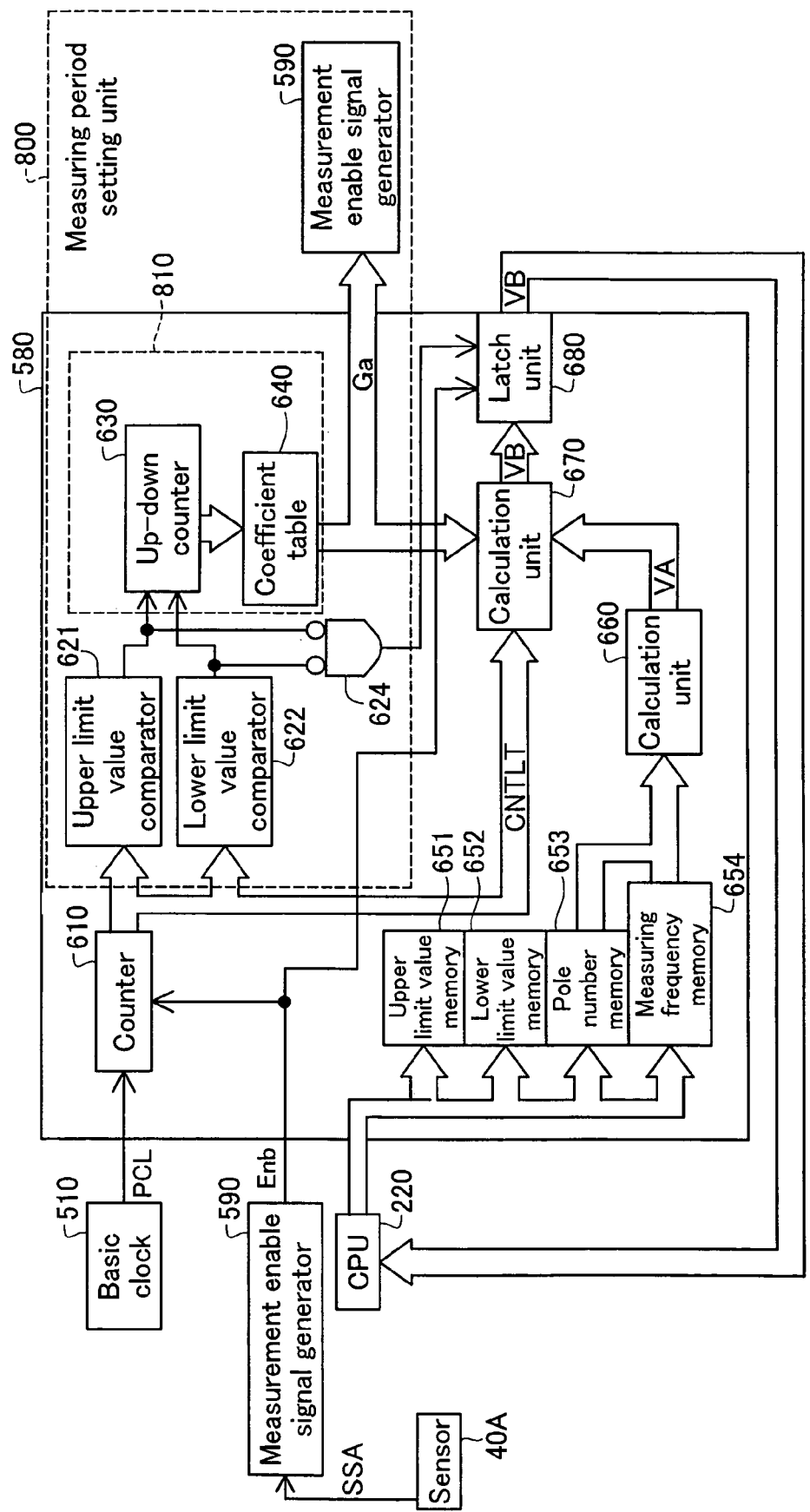
FIG. 11 is a block diagram depicting internal configuration of a measuring unit.

FIG. 11 is a block diagram depicting the internal configuration of the measuring unit 580 (FIG. 6A). This measuring unit 580 includes a counter 610; comparators 621, 622; a NOR gate 624; an up-down counter 630; a coefficient table 640; memories 651 through 654; a calculating unit 660; and a latch unit 680. FIG. 11 also depicts the CPU 220, the basic clock generating circuit 510, and the measurement enable signal generator 590 that are shown in FIG. 6A, as well as the motor position sensor 40A. For convenience of illustration, FIG. 11 shows two measurement enable signal generators 590; however, these are in fact the same single circuit.

Of the circuits depicted in FIG. 11, the circuit portions that include the comparators 621, 622, the up-down counter 630, the coefficient table 640, and the measurement enable signal generator 590 may be viewed as constituting a measuring period setting unit 800 that establishes a measuring period for counting the number of pulses in the counter 610. The circuit portions that include the up-down counter 630 and the coefficient table 640 may be viewed as constituting a duration coefficient adjusting unit 810 that adjusts a duration coefficient Ga, to be discussed later.

Figure 12:
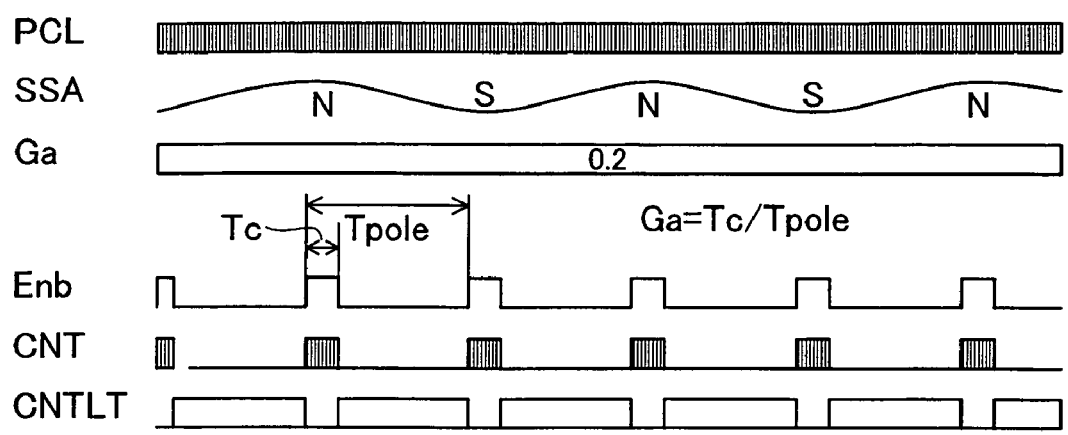
FIG. 12 is a timing chart depicting operation of a counter.

FIG. 12 is a timing chart depicting operation of the counter 610. The counter 610 counts the number of pulses of the basic clock signal PCL having a prescribed frequency. During this time, the counter 610 will count the number of pulses during a measuring period Tc indicated by the measurement enable signal Enb provided from the measurement enable signal generator 590, and obtain a count value CNTLT. The measurement enable signal Enb is a signal that indicates counting of the number of pulses during the measuring period Tc. The measuring period Tc is part of a period Tpole equivalent to one-half of one cycle of the sensor output SSA; it is specified by the duration coefficient Ga (=Tc/Tpole). Here, the "period Tpole equivalent to one-half of one cycle" corresponds to one pole of the motor (i.e. expressed in terms of phase difference, a period of π). FIG. 12 depicts counting of pulses of the clock signal PCL during the measuring period Tc. In the example of FIG. 12, the duration coefficient Ga is fixed at 0.2; however, the duration coefficient Ga will be adjusted, as will be discussed later.

As shown in FIG. 11, the count value CNTLT obtained in the counter 610 is provided to an upper limit value comparator 621, a lower limit value comparator 622, and a second calculating unit 670. The upper limit value comparator 621 decides whether the count value CNTLT has exceeded a prescribed upper limit value stored in advance in an upper limit value memory 651. The lower limit value comparator 622 decides whether the count value CNTLT is less than a prescribed lower limit value stored in advance in a lower limit value memory 652. In the event that the count value CNTLT has exceeded the upper limit value or is less than the lower limit value, the up-down counter 630 will be alerted to this effect by the comparators 621, 622. As a result, the duration coefficient Ga will be adjusted or modified in the manner to be discussed later, to change the duration of the measuring period Tc (FIG. 12) such that the count value CNTLT will lie within the range between the upper limit value and the lower limit value. As the upper limit value of the count value CNTLT it is possible to employ, for example, the maximum measurable value, which is limited by the number of bits of the counter 610. As the lower limit value of the count value CNTLT it is possible to employ an arbitrary small value (e.g. 100). The reason for restricting the count value CNTLT to within a range of no more than the upper limit value is in order to prevent overflow of the count value CNTLT. The reason for restricting the count value CNTLT to within a range not below the lower limit value is that rotation speed measurement error becomes appreciable if count values CNTLT are too small.

The up-down counter 630 is a circuit for the purpose of incrementing or decrementing the read address from the coefficient table 640, according to signals from the comparators 621, 622. In the coefficient table 640, multiple values for the duration coefficient Ga (FIG. 12) are stored in advance in order of magnitude; one of these values is selectively read out and presented to the calculating unit 670. It is possible for example to employ values such as 0.02, 0.05, 0.10, 0.20, 0.40, 0.70, and 1.00 as values of the duration coefficient Ga. The initial value of the duration coefficient Ga presented to the calculating unit 670 will be set to a value selected from among these (e.g. 0.20). As in the example discussed earlier, it is possible to employ 1.0 as the duration coefficient Ga; however, in preferred practice, at least the initial value will be set to a value less than 1.

If alerted by the upper limit value comparator 621 that the count value CNTLT has exceeded its upper limit value, the up-down counter 630 will decrease to the next smallest value the duration coefficient Ga to be read from the table 640. As a result, the measuring period Tc (FIG. 12) will be shorter, so the count value CNTLT will be smaller as well. On the other hand, if alerted by the lower limit value comparator 621 that the count value CNTLT is below its lower limit value, the up-down counter 630 will increase to the next largest value the duration coefficient Ga to be read from the table 640. As a result, the measuring period Tc will be longer, so the count value CNTLT will be greater as well. The duration coefficient Ga read from the table 640 is presented to the measurement enable signal generator 590 as well. The measurement enable signal generator 590 will generate a measurement enable signal Enb for the purpose of enabling the counter 610 only for the duration of the measuring period Tc specified by this duration coefficient Ga, and present the signal to the counter 610. The internal configuration and operation of the measurement enable signal generator 590 will be discussed later.

The calculating units 660, 670 perform calculations to derive the rotation speed of the motor, on the basis of the count value CNTLT; the duration coefficient Ga; the number of poles of the motor, which value is stored in a pole number memory 653; and the frequency of the clock signal PCL, which value is stored in a measuring frequency memory 654. The first calculating unit 660 calculates a first calculation value VA in accordance with Expression (1) below:

$$VA=60 \times Fc/P \qquad (1)$$

where P is the pole number of the motor, and Fc is the frequency of the clock signal PCL.

The second calculating unit 670 calculates a second calculation value VB in accordance with Expression (2) below:

$$VB=(VA \times Ga)/CNTLT \qquad (2)$$

Substituting the above Expression (1) into Expression (2) gives Expression (3):

$$VB=(60 \times Fc \times Ga)/(P \times CNTLT) \qquad (3)$$

As will be discussed below, this value VB is equal to the rotation speed of the motor. Here, first, let it be assumed that the rotation speed of the motor is Nrev (rpm). Where P is the pole number of the motor, the time Tpole (FIG. 12) required for rotation by a phase difference equivalent to a pole pitch is given by Expression (4) below:

$$Tpole=60/(Nrev \times P) \qquad (4)$$

Meanwhile, the count value CNTLT is a value obtained by counting clock pulses of frequency Fc (Hz) during the measuring period Tc which is a period specified by the duration coefficient Ga (=Tc/Tpole), from within the entire period Tpole corresponding to the phase difference equivalent to a pole pitch. Accordingly, the count value CNTLT is given by Expression (5) below:

$$CNTLT = Tpole \times Fc \times Ga \qquad (5)$$
$$= (60 \times Fc \times Ga)/(Nrev \times P)$$

Substituting Expression (5) in the right-hand side of Expression (3) gives:

$$VB = (60 \times Fc \times Ga)/(P \times CNTLT) \qquad (6)$$
$$= \{(60 \times Fc \times Ga)/P\} \times \{(Nrev \times P)/(60 \times Fc \times Ga)\}$$
$$= Nrev$$

Specifically, the second calculation value VB may be understood to indicate a value equal to the rotation speed of the motor Nrev (rpm). It is also possible for the calculations performed by the first and second calculating units 660, 670 to be performed by a single calculating unit.

FIG. 13 illustrates relationships among the motor rotation speed Nrev, and the various parameters Tpole, Ga, CNTLT, VA, and VB mentioned above. For reference, motor rotations per second Nsec (rotations/S) and rotation speed measuring error δ (=VB−Nrev) are shown as well. Here, the pole number P is 6; the clock frequency is 1 MHz; the upper limit value for count value CNTLT is 2,000,000; and the lower limit value is 1,000.

As will be understood from FIG. 13, in the present embodiment, the duration coefficient Ga is modified so that the count value CNTLT will lie between the upper limit value and the lower limit value. As mentioned previously, the upper limit value of the count value CNTLT is determined by a limiting value imposed by the number of bits of the counter 610 (i.e. the maximum value countable by the counter 610). The lower limit value is determined with the intention of avoiding excessive decline of measurement accuracy. Since the duration coefficient Ga is adjusted automatically in this way such that the count value CNTLT will lie in the range between the upper limit value and the lower limit value, it will be possible to measure rotation speed with consistently good accuracy. A particular advantage is that, as shown in FIG. 13, consistently high measurement accuracy is maintained even where the value of rotation speed varies through a wide range. Also, as shown in FIG. 12, since counting of clock pulses by the counter 610 is performed only during the period Tc which is part of the period Tpole equivalent to a pole pitch indicated by the sensor output SSA, measurement will be completed within a short time.

In the circuit of FIG. 11, the calculation result VB obtained by the second calculating unit 670 is latched by the latch unit 680, and presented to the CPU 220. Using this calculation result VB (=Nrev), the CPU 220 may display the motor rotation speed or modify control of the motor, as needed. However, in the event that the count value CNTLT lies outside of the range between the upper limit value and the lower limit value, the latch unit 680 will be disabled by a signal provided to the latch unit 680 by the comparators 621, 622 via the NOR gate 624. As a result, the output VB of the calculating unit 670 will not be latched by the latch unit 680, thus preventing an erroneous calculation result from being output to the CPU 220.

Figure 14A:
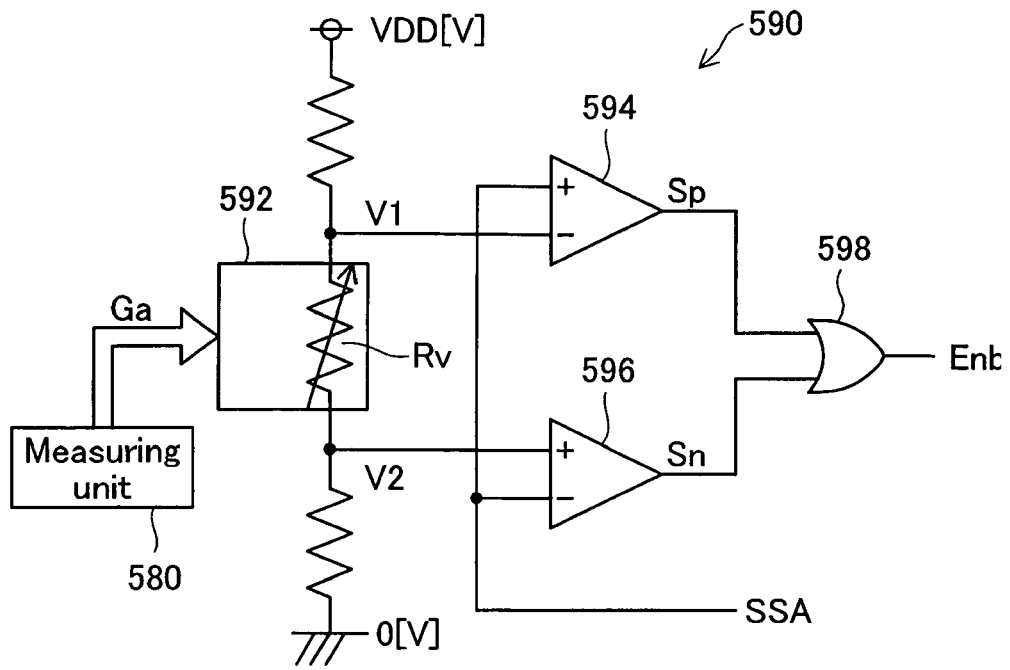
FIGS. 14A and 14B show an example of internal configuration and operation of a measurement enable signal generator.
Figure 14B:
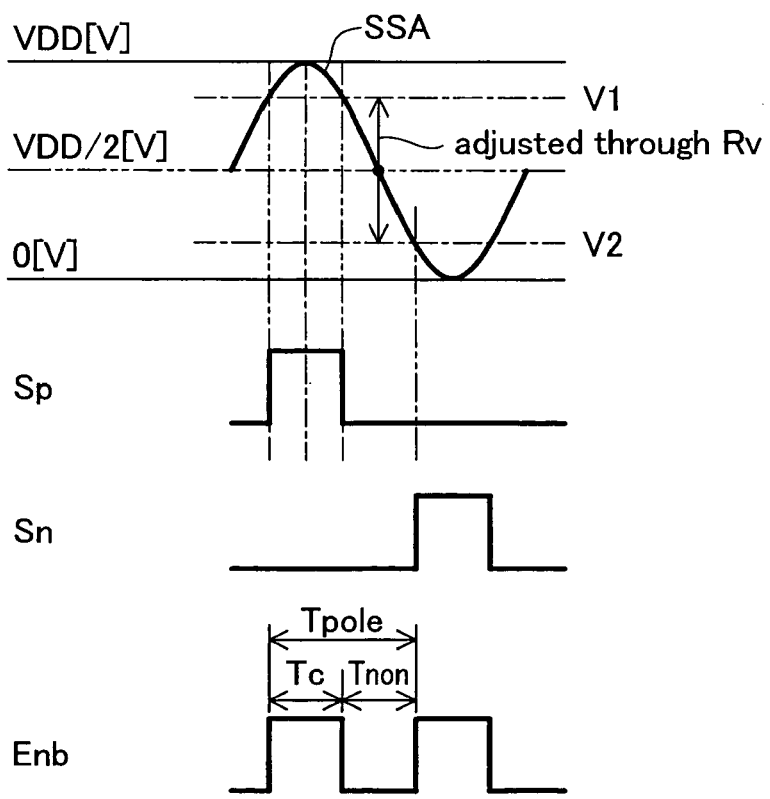

FIGS. 14A and 14B show an example of internal configuration and operation of the measurement enable signal generator 590. The measurement enable signal generator 590 has an electronic variable resistor 592, voltage comparators 594, 596, and an OR circuit 598. The resistance value Rv of the electronic variable resistor 592 is set according to the duration coefficient Ga provided by the measuring unit 580. The voltages V1, V2 at the terminals of the electronic variable resistor 592 are input to one input terminal of each of the voltage comparators 594, 596. The magnetic sensor output SSA is presented to the other input terminal of each of the voltage comparators 594, 596. The output signals Sp, Sn of the voltage comparators 594, 596 are input to the OR circuit 598. The output Enb of the OR circuit 598 is the measurement enable signal Enb, for distinguishing between measuring periods and non-measuring periods.

FIG. 14B depicts operation of the measurement enable signal generator 590. The terminal voltages V1, V2 of the electronic variable resistor 592 are modified by adjusting the resistance value Rv. Specifically, the terminal voltages V1, V2 are set to values of equal difference from the median value of the voltage range (=VDD/2). In the event that the magnetic sensor output SSA is greater than the first voltage V1, the output Sp of the first voltage comparator 594 will go to H level; while in the event that the magnetic sensor output SSA is lower than the second voltage V2, the output Sn of the second voltage comparator 596 will go to H level. The measurement enable signal Enb is a signal derived by taking the logical AND of these output signals Sp, Sn. Consequently, as shown at bottom in FIG. 14B, the measurement enable signal Enb may be used as a signal for distinguishing between measuring periods Tc and non-measuring periods Tnon. Distinction between measuring periods Tc and non-measuring periods Tnon is accomplished by varying the variable resistance value Rv depending on the duration coefficient Ga. As shown in FIG. 12, in order to make the measuring period Tc proportional to the duration coefficient Ga, it is preferable to preestablish the relationship of the duration coefficient Ga and the variable resistance value Rv in such a way that the variable resistance value Rv varies in nonlinear fashion depending on the duration coefficient Ga.

In this way, in the present embodiment, the number of pulses is counted only during a period Tc which is a part of but not the entirety of the period Tpole equivalent to a pole pitch, thereby making it possible to complete the rotation speed measurement within a short time. Moreover, since the duration coefficient Ga is adjusted automatically such that the count value CNTLT lies in the range between the upper limit value and the lower limit value, it is possible to measure rotation speed with consistently good accuracy over a wide range of rotation speeds.

C. Alternative Configuration of Measuring Unit

Figure 15:
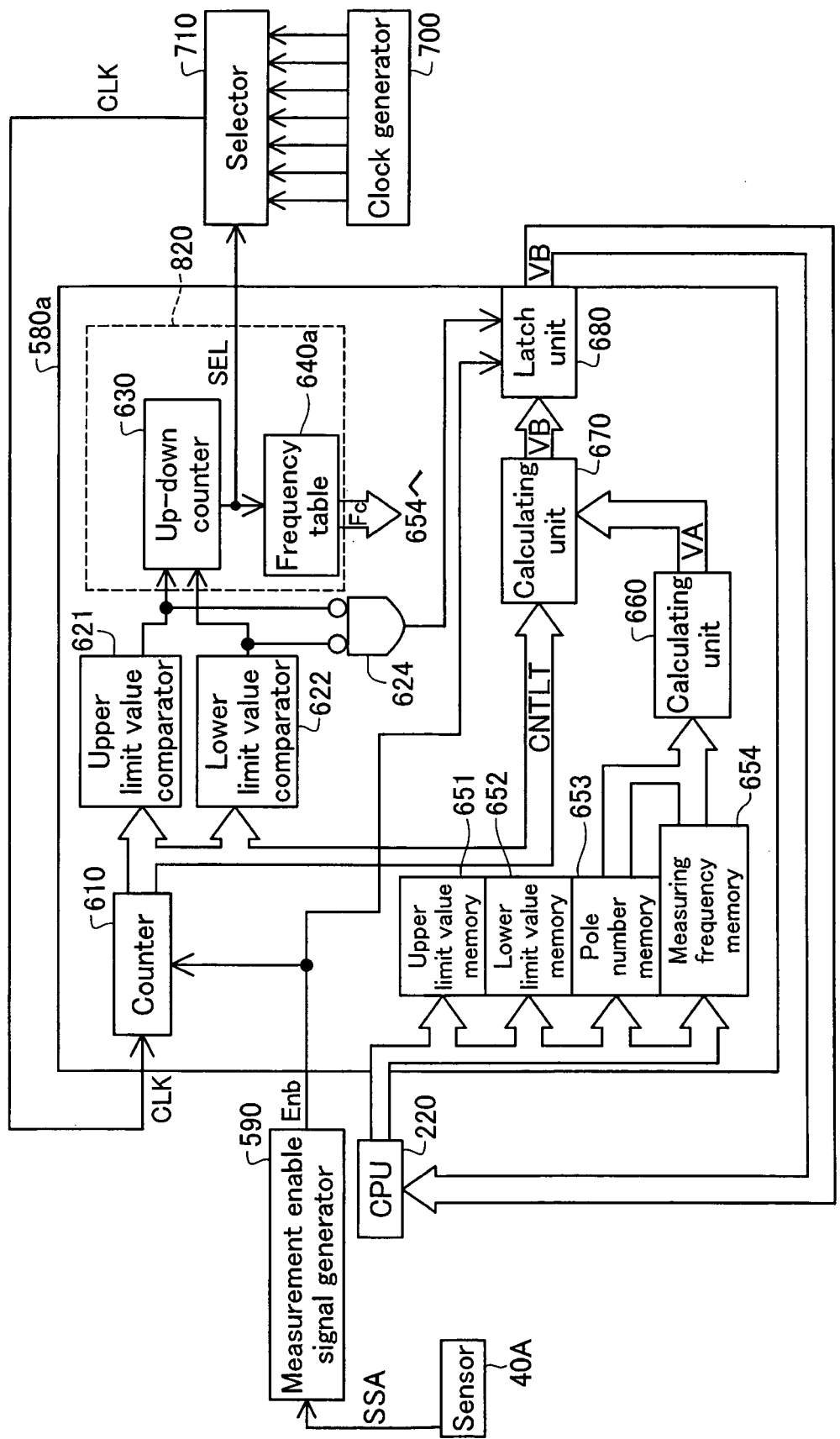
FIG. 15 is a block diagram depicting an alternative configuration of the measuring unit.

FIG. 15 is a block diagram depicting an alternative configuration of the measuring unit. In this circuit, the coefficient table 640 of FIG. 11 is replaced by a frequency table 604a; and the measurement enable signal generator 590 shown at the right edge of FIG. 11 is replaced by a clock generator 700 and a selector 710, but the circuit is otherwise identical to that of FIG. 11.

The clock generator 700 generates several clock signals of different frequencies. Depending on a Select signal SEL output by the up-down counter 630, the selector 710 will select one of the several clock signals and present it to the counter

610. The frequency table 640*a* will present to the measuring frequency memory 654 the value Fc of the frequency of the clock signal selected by the Select signal SEL. The measuring period Tc (FIG. 12) may be kept constant in this arrangement. In this case, since the duration coefficient Ga is fixed, it will be possible to save the duration coefficient Ga in a memory or register in the calculating unit 670, for example. Of the circuit elements of FIG. 15, it is possible to view the circuitry that includes the up-down counter 630 and the frequency table 640*a* as constituting a frequency adjusting unit 820 for adjusting the frequency of the clock signal CLK. In preferred practice the duration coefficient Ga will be set to value of less than 1.0; however, it is acceptable for Ga=1.0.

In the circuit of FIG. 15, the Select value SEL is modified so that the count value CNTLT will lie within the range between the upper limit value and the lower limit value; and the frequency of the clock signal CLK is modified accordingly. Specifically, if the count value CNTLT goes above the upper limit value, the frequency of the clock signal CLK will decrease, while if it is below the lower limit value, the frequency of the clock signal CLK will increase. Accordingly, in this circuit as well, consistently accurate measurement of rotation speed will be possible.

D. MODIFICATION EXAMPLES

The present invention is not limited to the embodiment described hereinabove, and may be reduced to practice in various other ways without departing from the spirit thereof. Modifications such as the following is possible, for example.

D1. Modification Example 1

In the embodiment described previously, the measuring unit is constructed so that the count value CNTLT lies in a range between a prescribed upper limit value and lower limit value; however, it is also possible to construct the measuring unit so as to not utilize either an upper limit value or a lower limit value, or both. For example, in the event that an upper limit value is not utilized, it will suffice for the number of bits of the counter 610 (FIG. 11) to be sufficiently large in comparison to the maximum value of rotation speed of the equipment being measured. In the event that a lower limit value is not utilized, measuring accuracy will be lower where rotation speed is low, but in some instances this will not pose any practical problems. In the event that neither the upper limit value nor the lower limit value is utilized, the duration coefficient Ga may be maintained at a prescribed fixed value less than 1. In this case as well, it is possible to measure rotation speed in a shorter time as compared to where the number of pulses is counted throughout the entire period Tpole (FIG. 12) of a phase difference equivalent to a pole pitch of the sensor output SSA.

D2. Modification Example 2

In the embodiment shown in FIG. 11, the duration coefficient Ga is varied by using the coefficient table 640, but it is possible to vary the duration coefficient Ga without using a table. For example, the duration coefficient Ga may be varied using addition/subtraction of a fixed value, or multiplication/division of a fixed value.

D3. Modification Example 3

In the embodiment described previously, magnetic sensors are used to obtain sensor outputs indicating position; however, it is possible to utilize instead another position sensor, such as a position encoder. However, it will be preferable to use as the position sensor on that outputs a position signal indicating M (where M is an integer equal to or greater than 2) rotation positions of equal phase difference in each one rotation of the motor. Here, "phase difference" refers to the difference of rotation angle.

D4. Modification Example 4

In the embodiment described previously, an electric motor is targeted for measurement, but the present invention is applicable to measurement any kind of rotating equipment. Measurements of rotation speed may be utilized for display or recording of rotation speed, for rotation speed control, or the like. Also, in the embodiment described previously, it is possible to carry out servo control (feedback control) using measurements of rotation speed to match the rotation speed of the motor with a target rotation speed. In this case, it will be preferable to constitute the drive control circuit 200 (FIG. 4A) so that it functions as a servo control circuit.

Figure 16:
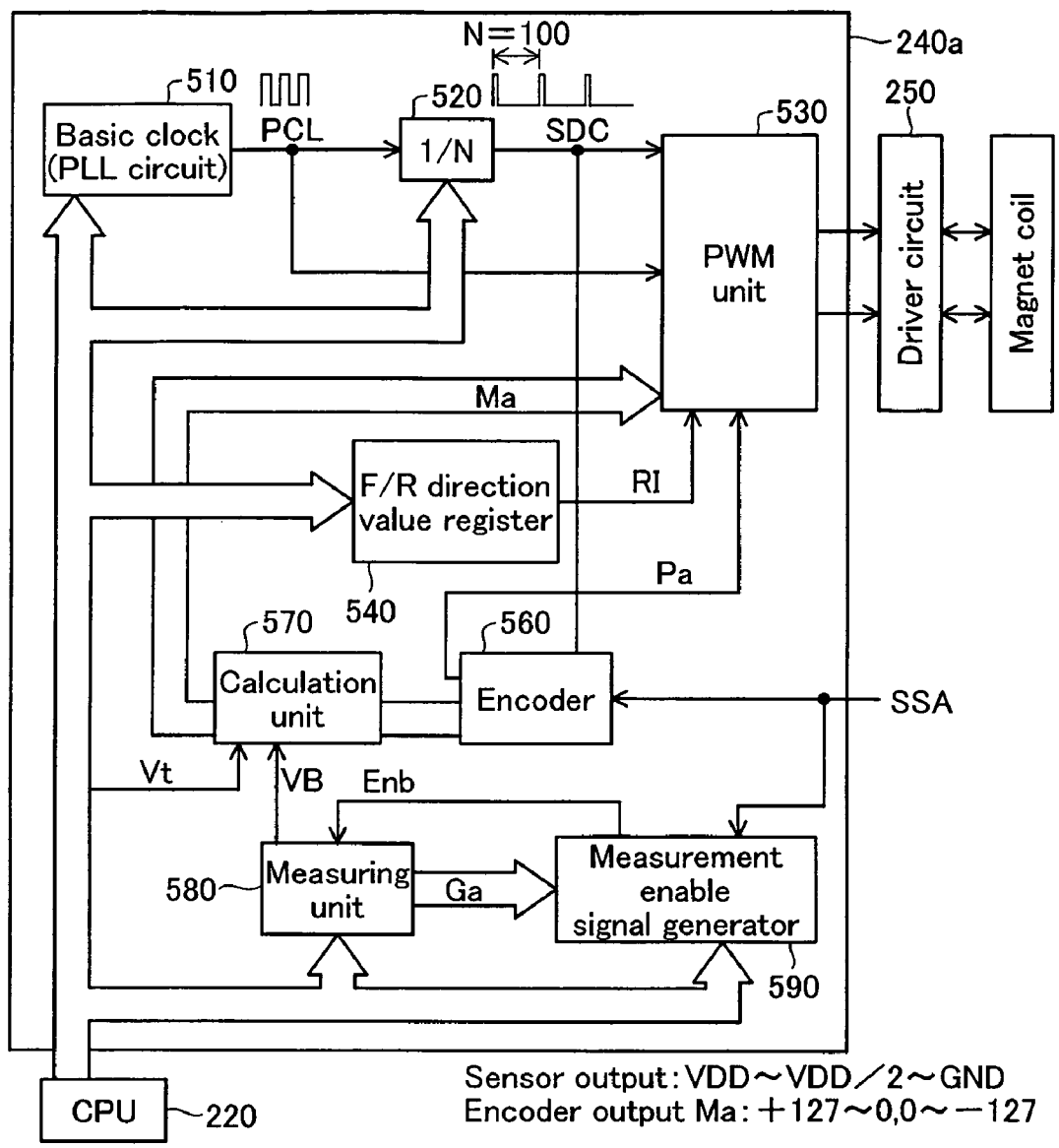
FIG. 16 is a block diagram depicting a modification example of a drive signal generator.

FIG. 16 is a block diagram depicting the configuration of a drive signal generator, in the case where the drive control circuit is constituted as a servo control circuit. This drive signal generator 240*a* has a calculating unit 570 added to the circuit shown in FIG. 6A. This calculating unit 570 is a circuit that increases or decreases an encoder output Ma depending on the difference between a target value Vt and the measured value VB (FIG. 13) of rotation speed. The rotation speed control will be carried out with the aid of such a calculating unit 570.

D4. Modification Example 5

The present invention is applicable to motors for various apparatuses and devices. For example, the present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive.

Figure 17:
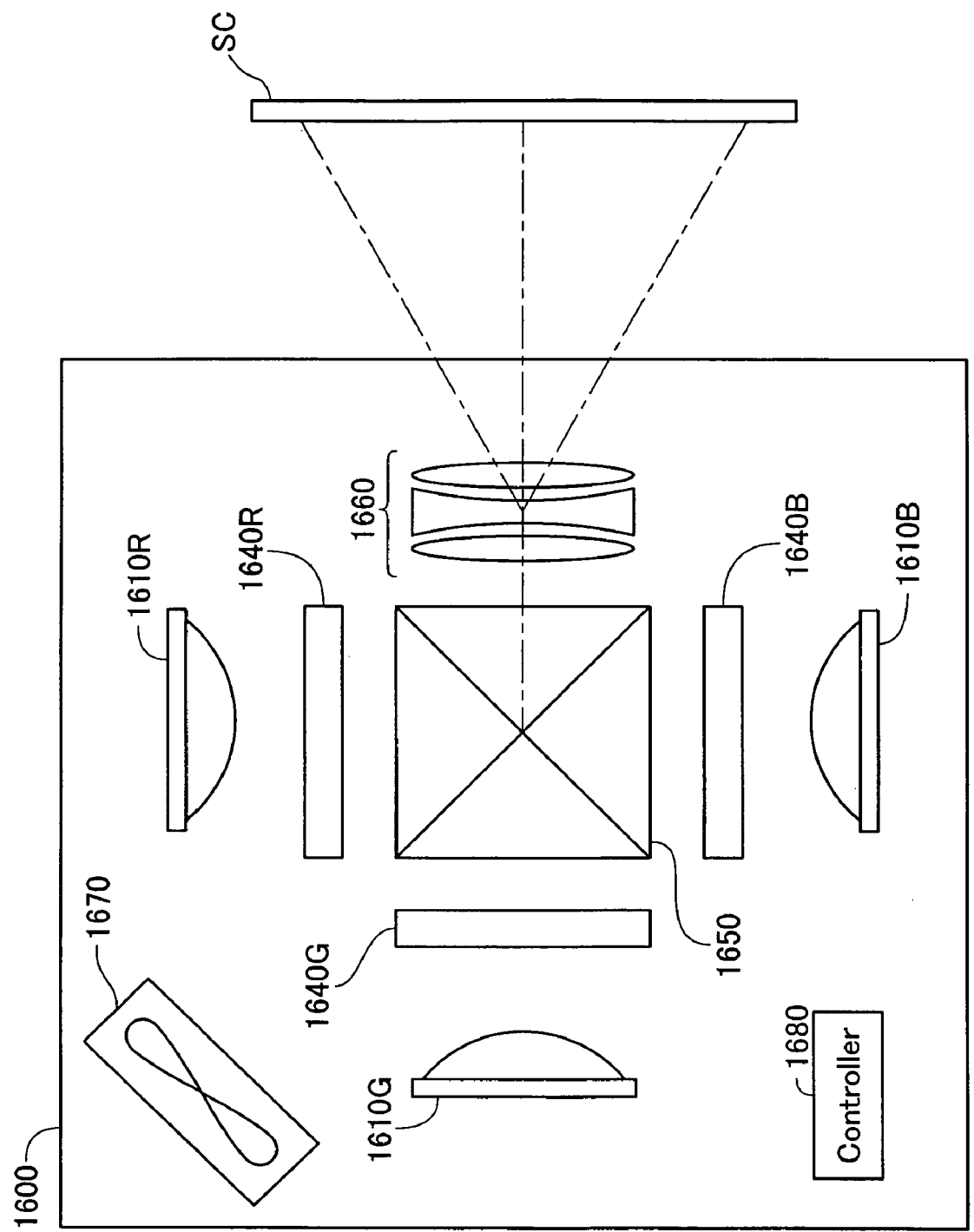
FIG. 17 illustrates a projector that utilizes a motor according to the embodiment of the present invention.

FIG. 17 illustrates a projector utilizing a motor according to the present invention. The projector 1600 includes three light sources 1610R, 1610G, 1610B for emitting three colored lights of red, green and blue, three liquid crystal light valves 1640R, 1640G, 1640B for modulating the three colored lights, a cross dichroic prism 1650 for combining the modulated three colored lights, a projection lens system 1660 for projecting the combined colored light toward a screen SC, a cooling fan 1670 for cooling the interior of the projector, and a controller 1680 for controlling the overall projector 1600. Various rotation type brushless motors described above can be used as the motor for driving the cooling fan 1670.

Figure 18A:
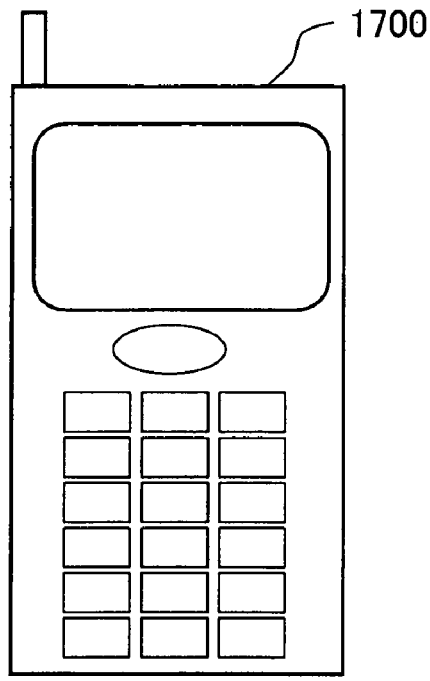
FIGS. 18A to 18C illustrate a fuel cell type mobile phone that utilizes a motor according to the embodiment of the present invention.
Figure 18B:
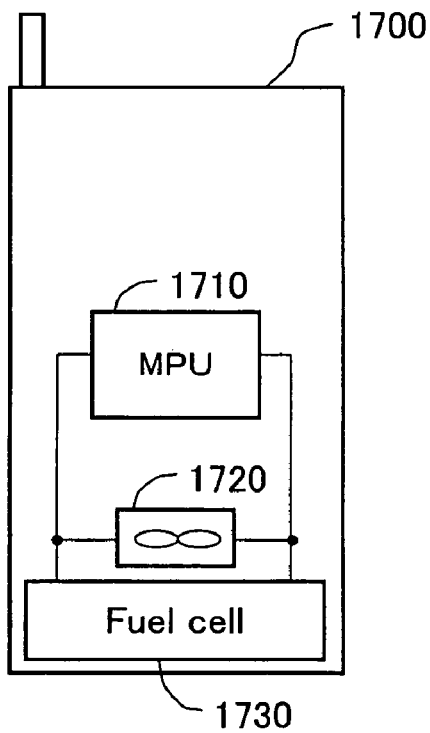
Figure 18C:
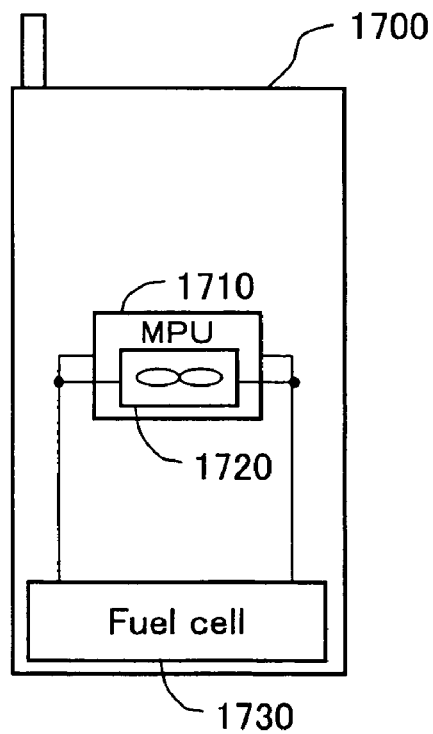

FIGS. 18A to 18C illustrate a mobile phone utilizing a motor according to the present invention. FIG. 18A shows the external view of a mobile phone 1700, and FIG. 18B shows its exemplary internal configuration. The mobile phone 1700 includes a MPU 1710 for controlling the operation of the mobile phone 1700, a fan 1720, and a fuel cell 1730. The fuel cell 1730 supplies power to the MPU 1710 and the fan 1720. The fan 1720 is installed in order to introduce air into the interior of the mobile phone 1700 to supply the air to the fuel cell 1730, or to exhaust the interior of the mobile phone 700 of water which will be produced by the fuel cell 1730. The fan 1720 may be installed over the MPU 1710, as illustrated in FIG. 18C, to cool the MPU 1710. Various rotation type brushless motors described above can be used as the motor for driving the fan 1720.

Figure 19:
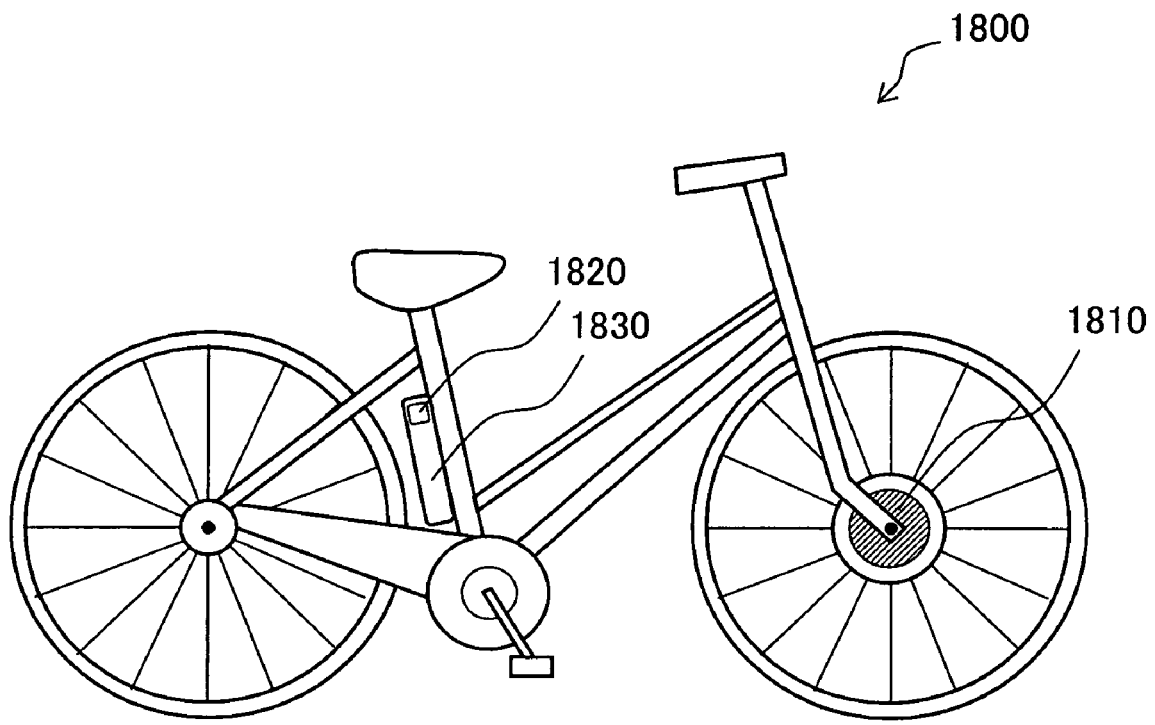
FIG. 19 illustrates an electrically powered bicycle (electric power assisted bicycle) as an example of a moving body utilizing motor/generator according to the embodiment of the present invention.

FIG. 19 illustrates an electric bicycle (electric-assisted bicycle) as an example of a moving body utilizing a motor according to the present invention. The bicycle 1800 includes a motor 1810 at the front wheel, and a control circuit 1820 and a rechargeable battery 1830 both attached on the frame under the saddle. The motor 1810 powered by the battery 1830 drives the front wheel to assist the run. During braking, the regenerated power by the motor 1810 is charged in the battery 1830. The control circuit 1820 controls the drive and regeneration of the motor 1810. Various brushless motors described above can be used as the motor 1810.

Figure 20:
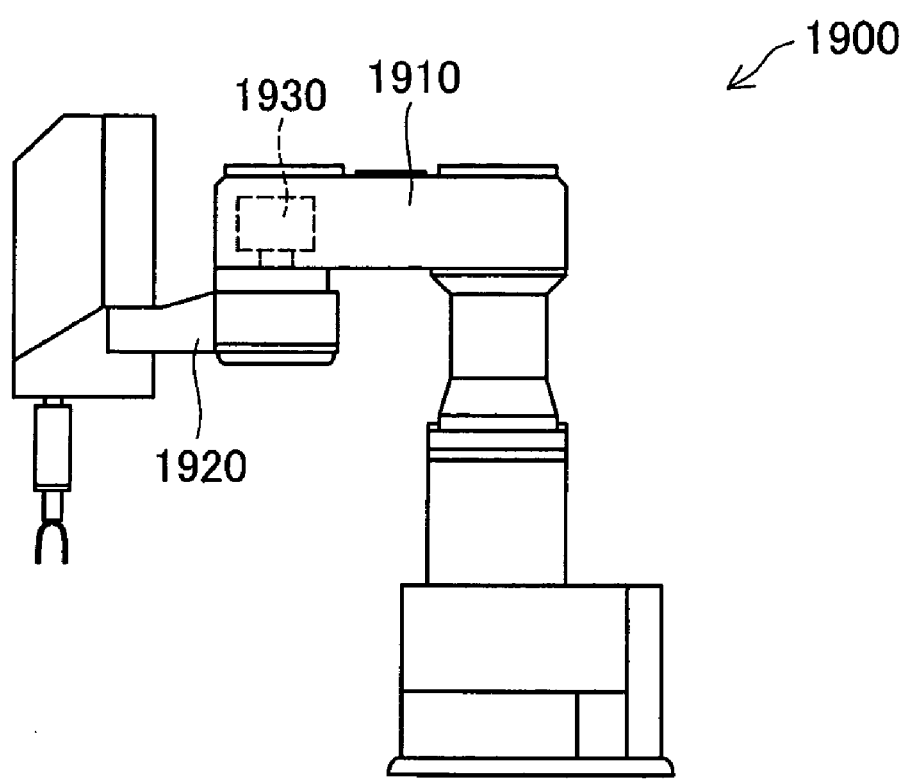
FIG. 20 illustrates an example of a robot that utilizes a motor according to the embodiment of the present invention.

FIG. 20 illustrates a robot utilizing a motor according to the present invention. The robot 1900 includes a first arm 1910, a second arm 1920, and a motor 1930. The motor 1930 is used to horizontally rotate the second arm 1920 as a driven member for the motor. Various brushless motors described above can be used as the motor 1930.

What is claimed is:

1. A device for measuring rotation speed of rotating equipment, comprising:
    a position sensor configured to output position signals indicating M number of rotation positions of a equal phase difference in each one rotation of the rotating equipment where M is an integer equal to or greater than 2;
    a clock signal generator configured to generate a basic clock signal;
    a counter configured to count the number of pulses of the basic clock signal;
    a measuring interval setting unit configured to set a duration coefficient that indicates a ratio of a measuring interval during a first time period between two successively occurring position signals and a second time period between two successively occurring position signals, where the measuring interval setting unit causing the counter to count the number of pulses of the basic clock signal during the measuring interval;
    a duration coefficient adjusting unit configured to adjust the duration coefficient such that a count value obtained in the measuring interval lies within a limit value; and
    a calculating unit configured to calculate a rotation speed of the rotating equipment as a function of the frequency of the basic clock signal, the integer M, the duration coefficient, and the count value obtained by the counter during the measuring interval.

2. The rotation speed measuring device according to claim 1, wherein
    the measuring interval setting unit includes:
        a comparator configured to decide whether the count value obtained in the measuring interval has exceeded a prescribed upper limit value; and
        a duration coefficient adjusting unit configured to decrease the duration coefficient if the count value has exceeded the upper limit value.

3. The rotation speed measuring device according to claim 2, wherein
    the comparator further decides whether the count value obtained in the measuring interval is less than a prescribed lower limit value, and
    the duration coefficient adjusting unit increases the duration coefficient if the count value is less than the lower limit value.

4. The rotation speed measuring device according to claim 2, wherein
    the duration coefficient adjusting unit includes a table containing a plurality of values for the duration coefficient that have been previously stored therein in order of magnitude, and selectively reads out from the table one value for use as the duration coefficient, and
    if the count value has exceeded the upper limit value or is less than the lower limit value, the duration coefficient adjusting unit changes the value of the duration coefficient read from the table to a next value in the order of magnitude.

5. The rotation speed measuring device according to claim 1, wherein
    the measuring interval setting unit includes:
        a comparator configured to decide whether the count value obtained in the measuring interval has exceeded a prescribed upper limit value; and
        a frequency adjusting unit configured to increase the frequency of the basic clock signal if the count value has exceeded the upper limit value.

6. The rotation speed measuring device according to claim 5, wherein
    the comparator further decides whether the count value obtained in the measuring interval is less than a prescribed lower limit value, and
    the frequency adjusting unit decreases the frequency of the basic clock signal if the count value is less than the lower limit value.

7. The rotation speed measuring device according to claim 5, wherein
    the frequency adjusting unit includes a table containing a plurality of frequency values that have been previously stored therein in order of magnitude for specifying the frequency of the basic clock signal, and selectively reads out one value from the table for use as the frequency value; and
    if the count value has exceeded the upper limit value or is less than the lower limit value, the frequency adjusting unit changes the value frequency value read from the table to a next value in the order of magnitude.

8. A method for measuring rotation speed of rotating equipment, comprising the steps of:
    (a) generating position signals indicating M number of rotation positions of a equal phase difference in each one rotation of the rotating equipment where M is an integer equal to or greater than 2;
    (b) generating a basic clock signal;
    (c) counting the number of pulses of the basic clock signal during a measuring interval;
    (d) setting a duration coefficient that indicates a ratio of the measuring interval during a first time period between two successively occurring position signals and a second time period between two successively occurring position signals;

(e) adjusting the duration coefficient such that a count value obtained in the measuring interval lies within a limit value; and (f) using a processor to calculate a rotation speed of the rotating equipment as a function of the frequency of the basic clock signal, the integer M, the duration coefficient, and the count value obtained during the measuring interval.

9. A motor having a rotation speed measuring device, the rotation speed measuring device comprising:

a position sensor configured to output position signals indicating M number of rotation positions of a equal phase difference in each one rotation of the rotating equipment where M is an integer equal to or greater than 2;

a clock signal generator configured to generate a basic clock signal;

a counter configured to count the number of pulses of the basic clock signal;

a measuring interval setting unit configured to set a duration coefficient that indicates a ratio of a measuring interval during a first time period between two successively occurring position signals and a second time period between two successively occurring position signals, where the measuring interval setting unit causing the counter to count the number of pulses of the basic clock signal during the measuring interval;

a duration coefficient adjusting unit configured to adjust the duration coefficient such that a count value obtained in the measuring interval lies within a limit value; and a calculating unit configured to calculate a rotation speed of the rotating equipment as a function of the frequency of the basic clock signal, the integer M, the duration coefficient, and the count value obtained by the counter during the measuring interval.

10. The motor of claim 9 further comprising a device, wherein the device is equipped with the motor.

11. The motor of claim 10 wherein the device is a mobile phone.

12. The motor of claim 10 wherein the device is a projector.

* * * * *